US010258209B2

(12) United States Patent
Song et al.

(10) Patent No.: US 10,258,209 B2
(45) Date of Patent: *Apr. 16, 2019

(54) HANDHELD CLEANER

(71) Applicant: Jiangsu Midea Cleaning Appliances Co., Ltd., Suzhou, Jiangsu (CN)

(72) Inventors: Bingxian Song, Jiangsu (CN); Min Zhong, Jiangsu (CN); Yonghua Wang, Jiangsu (CN)

(73) Assignee: Jiangsu Midea Cleaning Appliances Co., Ltd., Suzhou, Jiangsu (CN)

( * ) Notice: Subject to any disclaimer, the term of this patent is extended or adjusted under 35 U.S.C. 154(b) by 184 days.

This patent is subject to a terminal disclaimer.

(21) Appl. No.: 15/238,108

(22) Filed: Aug. 16, 2016

(65) Prior Publication Data
US 2018/0000296 A1    Jan. 4, 2018

(30) Foreign Application Priority Data

Jun. 30, 2016   (CN) .......................... 2016 1 0503150
Jun. 30, 2016   (CN) .......................... 2016 1 0503729
(Continued)

(51) Int. Cl.
*A47L 5/24*         (2006.01)
*A47L 9/24*         (2006.01)
(Continued)

(52) U.S. Cl.
CPC ................. *A47L 5/24* (2013.01); *A47L 9/106* (2013.01); *A47L 9/127* (2013.01); *A47L 9/165* (2013.01);
(Continued)

(58) Field of Classification Search
CPC ........ A47L 5/24; A47L 9/1608; A47L 9/1641; A47L 9/1683; A47L 9/24; A47L 9/2842;
(Continued)

(56) References Cited

U.S. PATENT DOCUMENTS 4,654,924 A *   4/1987   Getz ..................... A47L 9/0411
                                                    15/319
5,008,973 A *   4/1991   Worwag ................ A47L 9/0416
                                                    15/331
(Continued)

FOREIGN PATENT DOCUMENTS

CN         1813623 A   *   8/2006
CN       101143083 A   *   3/2008
(Continued)

OTHER PUBLICATIONS

Toshiba Vacuum Cleaner VC-CL100 Manual—Jan. 15, 2014.*
(Continued)

*Primary Examiner* — Marc Carlson
(74) *Attorney, Agent, or Firm* — Osha Liang LLP

(57) ABSTRACT

A handheld cleaner is provided. The handheld cleaner includes: a dust cup assembly comprising: a cup casing; a device housing configured to have a tube shape and disposed in the cup casing, wherein an outer end face of the device housing at an axial side thereof abuts against or extends out of a partial inner surface of the cup casing, and a dust removal chamber is defined between an inner surface of the cup casing and an outer peripheral surface of the device housing and surrounds the device housing along a circumferential direction of the device housing; and a negative pressure device located within the device housing and configured to enable dusty air to enter the dust removal chamber for dust and air separation; a holding assembly mounted to the dust cup assembly and configured for handholding.

24 Claims, 8 Drawing Sheets

(30) Foreign Application Priority Data

| | | |
|---|---|---|
| Jun. 30, 2016 | (CN) | 2016 1 0503910 |
| Jun. 30, 2016 | (CN) | 2016 1 0503971 |
| Jun. 30, 2016 | (CN) | 2016 1 0504525 |
| Jun. 30, 2016 | (CN) | 2016 1 0504599 |
| Jun. 30, 2016 | (CN) | 2016 1 0504616 |
| Jun. 30, 2016 | (CN) | 2016 1 0504892 |
| Jun. 30, 2016 | (CN) | 2016 1 0504893 |
| Jun. 30, 2016 | (CN) | 2016 2 0675696 U |
| Jun. 30, 2016 | (CN) | 2016 2 0675699 U |
| Jun. 30, 2016 | (CN) | 2016 2 0676341 U |
| Jun. 30, 2016 | (CN) | 2016 2 0676342 U |
| Jun. 30, 2016 | (CN) | 2016 2 0676343 U |
| Jun. 30, 2016 | (CN) | 2016 2 0676401 U |
| Jun. 30, 2016 | (CN) | 2016 2 0676789 U |
| Jun. 30, 2016 | (CN) | 2016 2 0677750 U |
| Jun. 30, 2016 | (CN) | 2016 2 0677833 U |
| Jun. 30, 2016 | (CN) | 2016 2 0677834 U |
| Jun. 30, 2016 | (CN) | 2016 2 0677884 U |
| Jun. 30, 2016 | (CN) | 2016 2 0678768 U |
| Jun. 30, 2016 | (CN) | 2016 2 0678770 U |

(51) Int. Cl.

| | |
|---|---|
| *A47L 9/16* | (2006.01) |
| *A47L 9/28* | (2006.01) |
| *B04C 5/187* | (2006.01) |
| *B04C 5/26* | (2006.01) |
| *B04C 5/28* | (2006.01) |
| *A47L 9/10* | (2006.01) |
| *A47L 9/12* | (2006.01) |
| *B01D 45/16* | (2006.01) |
| *B01D 46/24* | (2006.01) |
| *B01D 50/00* | (2006.01) |
| *B04C 9/00* | (2006.01) |

(52) U.S. Cl.
CPC ........... *A47L 9/1608* (2013.01); *A47L 9/1616* (2013.01); *A47L 9/1633* (2013.01); *A47L 9/1641* (2013.01); *A47L 9/1658* (2013.01); *A47L 9/1666* (2013.01); *A47L 9/1683* (2013.01); *A47L 9/24* (2013.01); *A47L 9/2842* (2013.01); *B01D 45/16* (2013.01); *B01D 46/2403* (2013.01); *B01D 50/002* (2013.01); *B04C 5/187* (2013.01); *B04C 5/26* (2013.01); *B04C 5/28* (2013.01); *B04C 9/00* (2013.01); *B01D 2279/55* (2013.01); *B04C 2009/004* (2013.01); *B04C 2009/008* (2013.01)

(58) Field of Classification Search
CPC ........ A47L 9/106; A47L 9/127; A47L 9/1616; A47L 9/1633; A47L 9/165; A47L 9/1658; A47L 9/1666; B01D 2279/55; B01D 45/16; B01D 46/2403; B01D 50/002; B04C 2009/004; B04C 2009/008; B04C 5/187; B04C 5/26; B04C 5/28; B04C 9/00

See application file for complete search history.

(56) References Cited

U.S. PATENT DOCUMENTS

| | | | | |
|---|---|---|---|---|
| 6,083,292 | A | * | 7/2000 | Fumagalli ............. A47L 9/1608 55/318 |
| 7,770,256 | B1 | | 8/2010 | Fester |
| 2002/0189048 | A1 | * | 12/2002 | Maruyama ................ A47L 5/24 15/344 |
| 2008/0190080 | A1 | | 8/2008 | Oh et al. |
| 2008/0256744 | A1 | * | 10/2008 | Rowntreer ............... A47L 5/22 15/350 |
| 2009/0019663 | A1 | * | 1/2009 | Rowntree ................ A47L 5/24 15/347 |
| 2009/0119867 | A1 | * | 5/2009 | Senoo ................... A47L 9/2815 15/319 |
| 2009/0282639 | A1 | * | 11/2009 | Dyson ...................... A47L 5/24 15/344 |
| 2013/0019901 | A1 | * | 1/2013 | Gerhards .............. A47L 9/2821 134/21 |
| 2013/0091654 | A1 | * | 4/2013 | Smith ..................... A47L 5/24 15/344 |
| 2013/0091815 | A1 | | 4/2013 | Smith |
| 2015/0093973 | A1 | | 4/2015 | Sergyeyenko et al. |
| 2016/0100732 | A1 | * | 4/2016 | Jeong .................... A47L 9/2821 15/319 |
| 2016/0270614 | A1 | * | 9/2016 | Kawamura ............... A47L 5/24 |
| 2017/0150858 | A1 | * | 6/2017 | Lee ......................... A47L 9/068 |
| 2017/0215669 | A1 | * | 8/2017 | O'Neill ................... A47L 9/062 |
| 2017/0319026 | A1 | * | 11/2017 | Roschi ................. A47L 9/0606 |
| 2017/0369032 | A1 | * | 12/2017 | Hill ..................... B60R 25/1004 |
| 2018/0000295 | A1 | * | 1/2018 | Song ......................... A47L 5/24 |
| 2018/0000297 | A1 | * | 1/2018 | Song ......................... A47L 5/24 |
| 2018/0000304 | A1 | * | 1/2018 | Zhong .................. A47L 9/1683 |

FOREIGN PATENT DOCUMENTS

| | | | | |
|---|---|---|---|---|
| CN | 202537412 | U | * | 11/2012 |
| CN | 102217912 | B | | 9/2013 |
| CN | 203676998 | U | * | 7/2014 |
| DE | 2627560 | A1 | | 12/1977 |
| EP | 2581013 | A1 | | 4/2013 |
| JP | 1968029422 | B | | 12/1968 |
| JP | 1970027827 | B | | 9/1970 |
| JP | 1973021614 | B | | 6/1973 |
| JP | 1974026355 | A | | 3/1974 |
| JP | H0382430 | A | | 4/1991 |
| JP | H03280915 | A | | 12/1991 |
| JP | H 07322989 | A | * | 12/1995 |
| JP | 2002112938 | A | | 4/2002 |
| JP | 2003290096 | A | | 10/2003 |
| WO | 2015/068817 | A1 | | 5/2015 |

OTHER PUBLICATIONS

JPH 07322989 A—Dec. 1995—English Machine Translation.*
Office Action issued in corresponding European Application No. 16184527.6, dated May 31, 2017 (7 pages).
Office Action issued in corresponding Japanese Application No. 2016-159970, dated Oct. 24, 2017 (13 pages).
International Search Report and Written Opinion for corresponding International Application No. PCT/CN2016/090039, dated Mar. 30, 2017 (27 pages).
Office Action issued in corresponding Canadian Application No. 2,971,068, dated Jun. 29, 2018 (6 pages).

* cited by examiner

HANDHELD CLEANER

FIELD

The present invention relates to a field of cleaning machines, and more particularly to a handheld cleaner.

BACKGROUND

A handheld cleaner in the related art is inconvenient for handheld use due to its large volume and great weight, and has a loose layout of air passages and thus high suction power loss.

SUMMARY

The present invention aims to solve at least one of the problems existing in the related art. Thus, embodiments of the present invention provide a handheld cleaner that is small and lightweight and has a compact structure and high energy efficiency.

The handheld cleaner according to the present invention includes: a dust cup assembly comprising a cup casing; a device housing configured to have a tube shape and disposed in the cup casing, wherein an outer end face of the device housing at an axial side thereof abuts against or extends out of a partial inner surface of the cup casing, and a dust removal chamber is defined between an inner surface of the cup casing and an outer peripheral surface of the device housing and surrounds the device housing along a circumferential direction of the device housing; and a negative pressure device located within the device housing and configured to enable dusty air to enter the dust removal chamber for dust and air separation; and a holding assembly mounted to the dust cup assembly and configured for handholding.

The handheld cleaner according to embodiments of the present invention is small and lightweight and has a compact structure and high energy efficiency.

According to an example of the present invention, the partial inner surface of the cup casing has an opening, the outer end face of the device housing at the axial side thereof has an air exhaust port, the air exhaust port is disposed at the opening and exposed from the opening, and the negative pressure device is further configured to make an airstream separated from the dust removal chamber enter the device housing and exhausted through the air exhaust port.

According to an example of the present invention, the handheld cleaner further includes an in-cover filter disposed in the device housing and located between the air exhaust port and the negative pressure device.

According to an example of the present invention, the opening is formed in a bottom wall of the cup casing, the device housing is configured to have an upright tube shape, and the air exhaust port is formed at a bottom end of the device housing.

According to an example of the present invention, the device housing includes: a housing body configured to have an upright tube shape and having a bottom end abutting against an inner bottom wall of the cup casing, wherein the dust removal chamber is defined between the inner surface of the cup casing and an outer peripheral surface of the housing body and surrounds the housing body along a circumferential direction of the housing body; and a housing bottom configured to have a bowl shape and connected to a bottom of the housing body, wherein an outer bottom wall of the housing bottom is fitted with the inner bottom wall of the cup casing, or at least part of the housing bottom extends downwards out of the inner bottom wall of the cup casing via the opening, and the air exhaust port is formed in the housing bottom.

According to an example of the present invention, the dust cup assembly further includes: a cyclone separating device disposed in the dust removal chamber and defining multiple stages of cyclone chambers communicated successively in a flow direction of an airstream in the dust removal chamber; each stage of cyclone chamber is configured to be a hollow annular-columnar chamber, and an upstream stage of cyclone chamber surrounds a downstream stage of cyclone chamber along the circumferential direction of the device housing, and the most downstream stage of cyclone chamber surrounds the device housing along the circumferential direction of the device housing.

According to an example of the present invention, the cyclone separating device includes a first cyclone separating member and a second cyclone separating member, the first cyclone separating member surrounds the device housing and the second cyclone separating member surrounds the first cyclone separating member; and the negative pressure device is further configured to make the dusty air entering the dust removal chamber first undergo dust and air separation by the second cyclone separating member and then undergo dust and air separation by the first cyclone separating member.

According to an example of the present invention, the device housing includes a first tube segment, a transition tube segment and a second tube segment successively connected along an axial direction of the device housing, in which a maximum diameter of the first tube segment is smaller than a minimum diameter of the second tube segment; in a radial direction of the device housing, the first cyclone separating member is opposite to the first tube segment or to the first tube segment and the transition tube segment, and the negative pressure device is opposite to the second tube segment or to the second tube segment and the transition tube segment.

According to an example of the present invention, at least part of the first cyclone separating member and at least part of the second cyclone separating member are both in one piece with the device housing.

According to an example of the present invention, the second cyclone separating member is configured as a continuous tube-shaped filter sleeved between the device housing and the cup casing; a first-stage cyclone chamber is defined by the second cyclone separating member and the cup casing; and an outer peripheral surface of the continuous tube-shaped filter is formed with a dust collecting groove recessed inwards and communicating with the first-stage cyclone chamber.

According to an example of the present invention, the second cyclone separating member is configured as a split tube-shaped filter sleeved between the device housing and the cup casing; a first-stage cyclone chamber is defined by the second cyclone separating member, the device housing and the cup casing; and a dust collecting groove is defined by a split of the split tube-shaped filter and the outer peripheral surface of the device housing, and communicates with the first-stage cyclone chamber.

According to an example of the present invention, a plurality of dust collecting grooves are provided and spaced apart from one another in the circumferential direction of the device housing, and each dust collecting groove extends along the axial direction of the device housing.

According to an example of the present invention, the cup casing is configured to have a tube shape, and an inner peripheral wall of the cup casing is provided with a first dust-blocking sheet extending towards an interior of the cup casing, and/or the cup casing is configured to have a tube shape, and an inner end wall of the cup casing is provided with a second dust-blocking sheet extending towards the interior of the cup casing.

According to an example of the present invention, the cup casing includes: a cup body configured to have a tube shape and having an axial open end; and a cup cover assembly configured to detachably cover the open end of the cup body.

According to an example of the present invention, the cup cover assembly includes: an inner cover disposed on the open end of the cup body; an outer cover disposed on the open end of the cup body and covered over the inner cover, and an in-cover air passage member detachably disposed between the inner cover and the outer cover or integrally formed to an inner surface of the outer cover, in which a communicating chamber is defined between the in-cover air passage member and the inner cover, and the negative pressure device is configured to enable the airstream separated from the dust removal chamber to enter the device housing through the communicating chamber.

According to an example of the present invention, the cup cover assembly further includes: an in-cover filter detachably disposed in the communicating chamber to filter the airstream flowing into the communicating chamber.

According to an example of the present invention, the inner cover has an extension segment extending towards an interior of the cup body, and the extension segment defines an inflow communication hole for communicating the dust removal chamber with the communicating chamber, the inner cover has an air outlet ring fitted with an air inlet end of the device housing through sleeve connection, and the air outlet ring defines an outflow communication hole for communicating the communicating chamber with an interior of the device housing.

According to an example of the present invention, the negative pressure device is mounted to the device housing through a bracket, and the bracket includes: an upholding portion supporting a bottom of the negative pressure device; a connecting portion connected with the upholding portion and connected to the device housing; and a position limiting portion configured to be annular, fitted over the negative pressure device, and connected to the connecting portion and/or the upholding portion.

According to an example of the present invention, a vibration absorbing member is provided between the bracket and the negative pressure device, and a part of a side surface of the vibration absorbing member facing the negative pressure device is spaced apart from the negative pressure device.

According to an example of the present invention, the device housing further includes a positioning member configured to be fitted with the negative pressure device while positioning the negative pressure device, so as to prevent an upward displacement of the negative pressure device.

According to an example of the present invention, the holding assembly is configured as a handle assembly, and the handle assembly includes: a handle casing having a holding portion for user handholding; and a power supply device disposed in the holding portion, and/or disposed at a position in the handle casing opposite to the holding portion.

According to an example of the present invention, the handle casing has a gripping hole; the handle casing includes the holding portion and a mounting portion located at two sides of the gripping hole, the mounting portion is connected with the dust cup assembly; and the power supply device is disposed in the mounting portion and/or the holding portion.

According to an example of the present invention, the handheld cleaner further includes an extension pipe, and the extension pipe includes: a pipe body member configured as a hollow pipe with two open ends and having a first end connected with a dust suction inlet of the cup casing; and a rotating member provided at a second end of the pipe body member, formed in one piece with the pipe body member, and provided with an inlet hole in communication with an interior of the pipe body member, such that dust enters the pipe body member through the inlet hole and enters the dust suction inlet along the pipe body member, in which the rotating member is capable of rotating relative to the pipe body member, and orientation of the inlet hole is changed with respect to the pipe body member during rotation of the rotating member.

According to an example of the present invention, the pipe body member and the rotating member are connected by a pivoting shaft, or the pipe body member and the rotating member are connected through spherical fit.

According to an example of the present invention, the handheld cleaner further includes an extension pipe configured as a hollow pipe with two open ends, wherein a first end of the extension pipe is detachably communicated with a dust suction inlet of the cup casing, and a second end thereof has a cleaning member formed in one piece with the extension pipe.

According to an example of the present invention, the handheld cleaner further includes a telescopic hose having a first end extending into and fixed in the extension pipe, and a second end detachably connected with the dust suction inlet, in which the first end of the extension pipe is detachably connected with the cup casing, and the telescopic hose is received within the extension pipe when the extension pipe is connected with the cup casing.

According to an example of the present invention, the handheld cleaner further includes: a cabinet comprising the cup casing and a handle casing; a first detection device disposed to the cabinet and configured to detect a motion state of the cabinet; and a control device connected with the first detection device and the negative pressure device, and configured to control a working state of the handheld cleaner according to information detected by the first detection device.

According to an example of the present invention, the control device is configured to control the negative pressure device to increase suction strength thereof if the first detection device detects that a motion speed of the cabinet rises, and to control the negative pressure device to decrease the suction strength thereof if the first detection device detects that the motion speed of the cabinet drops.

According to an example of the present invention, the control device is configured to control the negative pressure device to shut down, if the first detection device detects that the cabinet has never moved in a first predetermined duration during operation of the negative pressure device; the control device is configured to control the negative pressure device to turn on, if the first detection device detects displacement of the cabinet in a second predetermined duration after the shutdown of the negative pressure device; and the control device is configured to control the handheld cleaner to turn off, if the first detection device detects no displacement of the cabinet in the second predetermined duration after the shutdown of the negative pressure device.

According to an example of the present invention, the cup casing has an air intake passage in communication with the dust removal chamber, and the handheld cleaner further includes: a second detection device configured to detect a dust concentration in the air intake passage; and a control device connected with the second detection device and the negative pressure device, and configured to control a working state of the negative pressure device according to information detected by the second detection device.

According to an example of the present invention, the control device is configured to control the negative pressure device to increase suction strength thereof if the second detection device detects that the dust concentration rises; and the control device is configured to control the negative pressure device to decrease the suction strength thereof if the second detection device detects that the dust concentration drops.

Additional aspects and advantages of embodiments of present invention will be given in part in the following descriptions, become apparent in part from the following descriptions, or be learned from the practice of the embodiments of the present invention.

Figure 1:
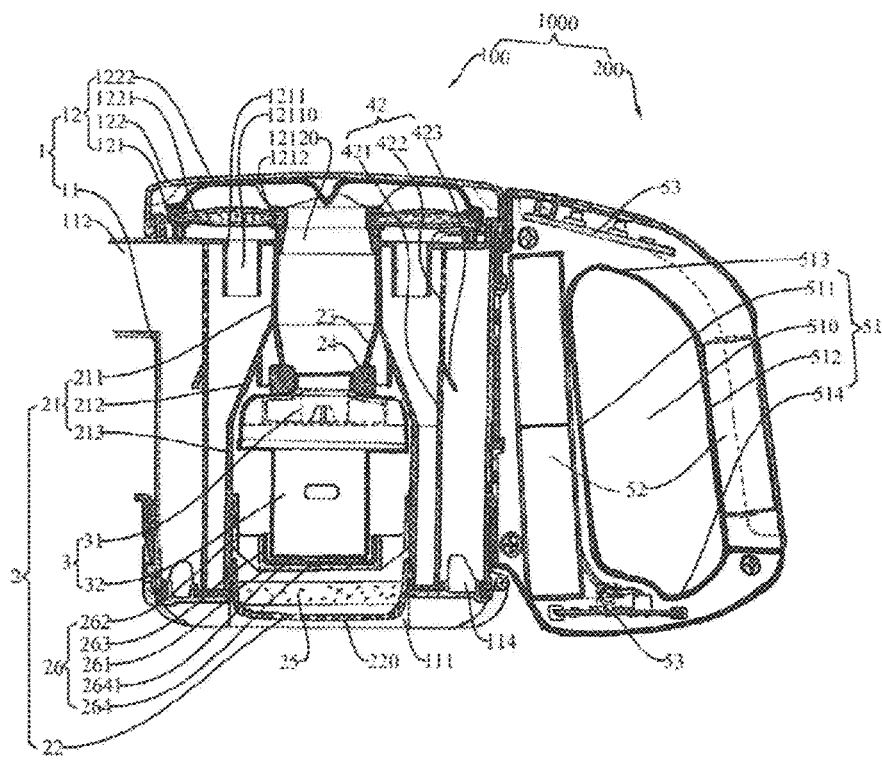
FIG. 1 is a sectional view of a handheld cleaner according to an embodiment of the present invention.

REFERENCE NUMERALS 1000 handheld cleaner
  100 dust cup assembly
    1 cup casing
      11 cup body, 110 inner bottom wall, 111 opening, 112 dust suction inlet, 113 first dust-blocking sheet, 114 second dust-blocking sheet,
      12 cup cover assembly, 121 inner cover, 1211 extension segment, 12110 inflow communication hole, 1212 air outlet ring, 12120 outflow communication hole, 122 outer cover, 1221 in-cover filter, 1222 in-cover air passage member,
    2 device housing
      21 housing body, 211 first tube segment, 212 transition tube segment, 213 second tube segment,
      22 housing bottom, 220 air exhaust port, 23 positioning member, 24 sealing member, 25 in-housing filter,
      26 bracket, 261 upholding portion, 262 connecting portion, 263 position limiting portion, 264 vibration absorbing member, 2641 protrusion;
    3 negative pressure device
      31 fan, 32 motor;
    4 cyclone separating device
      41 first cyclone separating member, 410 cyclone, 411 straight tube segment, 412 tapered tube segment,
      42 second cyclone separating member, 421 separating tube portion, 4210 dust collecting groove,
      422 filtration tube portion, 4221 filtration hole, 423 eaves ring portion;
    A1 dust removal chamber
      A11 first-stage cyclone chamber, A12 second-stage cyclone chamber, A10 cyclone air passage, A13 secondary dust accumulating chamber,
    A2 communicating chamber
      A20 communication air passage;
    A3 air exhaust chamber
  200 handle assembly
    51 handle casing, 510 finger gripping portion, 511 mounting portion, 512 holding portion, 513 handle top, 514 handle bottom;
    52 power supply device;
    53 electric control board;
  300 extension pipe
    61 pipe body member, 62 rotating member, 621 semi-annular portion, 622 inlet hole, 63 cleaning member, 631 bristle portion, 64 pivoting shaft;
  400 telescopic hose;
  500A first detection device;

500B second detection device, 501B emitter, 502B receiver.

DETAILED DESCRIPTION

Embodiments of the present invention will be described in detail and examples of the embodiments will be illustrated in the drawings, where same or similar reference numerals are used to indicate same or similar members or members with same or similar functions. The embodiments described herein with reference to drawings are explanatory, which are used to illustrate the present invention, but shall not be construed to limit the present invention.

The following description provides many different embodiments or examples to realize different structures of the present invention. To simplify the description of the present invention, components and configurations in specific examples are elaborated. Of course, they are explanatory, and are not intended to limit the present invention. Moreover, reference numbers and/or letters may be repeated in different examples of the present invention for the purpose of simplicity and clarity, which shall not be constructed to indicate the relationships among various embodiments and/or configurations. In addition, the present invention provides examples of various specific processes and materials, but applicability of other processes and/or utilization of other materials are conceivable for those skilled in the art.

A handheld cleaner 1000 according to embodiments of the present invention will be described with reference to the drawings.

As shown in FIG. 1, the handheld cleaner 1000 according to embodiments of the present invention includes a dust cup assembly 100, an extension pipe 300 and a holding assembly. The dust cup assembly 100 may suck dusty air in the environment through the extension pipe 300, filter dust out from the dusty air, and blow a purified airstream back to the environment, which functions as absorption of dust in the environment. The holding assembly is mounted to the dust cup assembly 100 and configured for handheld use. For example, the holding assembly may be a lift handle or a handle assembly 200 shown in FIG. 1, such that a user may move the dust cup assembly 100 through the holding assembly to clean a target area (such as a sofa surface and a ceiling) in the environment.

As shown in FIG. 1, the dust cup assembly 100 includes a cup casing 1, a device housing 2 and a negative pressure device 3, in which the device housing 2 is disposed within the cup casing 1 and the negative pressure device 3 is disposed within the device housing 2. That is, the cup casing 1 encloses the device housing 2 and the device housing 2 encloses the negative pressure device 3, such that the negative pressure device 3 is accommodated in the cup casing 1, thereby improving structural compactness of the dust cup assembly 100, making the dust cup assembly 100 small and lightweight, facilitating handheld use and realizing aesthetic appearance. Preferably, the cup casing 1 and the device housing 2 are detachably connected to facilitate cleaning, maintenance and replacement.

It should be noted herein that the term "the device housing 2 disposed within the cup casing 1" should be interpreted broadly, i.e. interpreted in this way that other parts of the device housing 2 are disposed within the cup casing 1, except a part thereof disposed at an opening 111 and described in the following paragraph, and the part of the device housing 2 may be disposed within the cup casing 1 or extend out of an inner chamber of the cup casing 1 via the opening 111.

Referring to FIG. 1, the cup casing 1 has the opening 111, and the part of the device housing 2 has an air exhaust port 220 and is disposed at the opening 111 and exposed from the opening 111. That is, the part of the device housing 2 is disposed at the opening 111 and exposed from the opening 111, and has the air exhaust port 220 that is also exposed from the opening 111, such that an airstream in the device housing 2 may flow to the outside of the cup casing 1 through the air exhaust port 220 and the opening 111.

Figure 3:
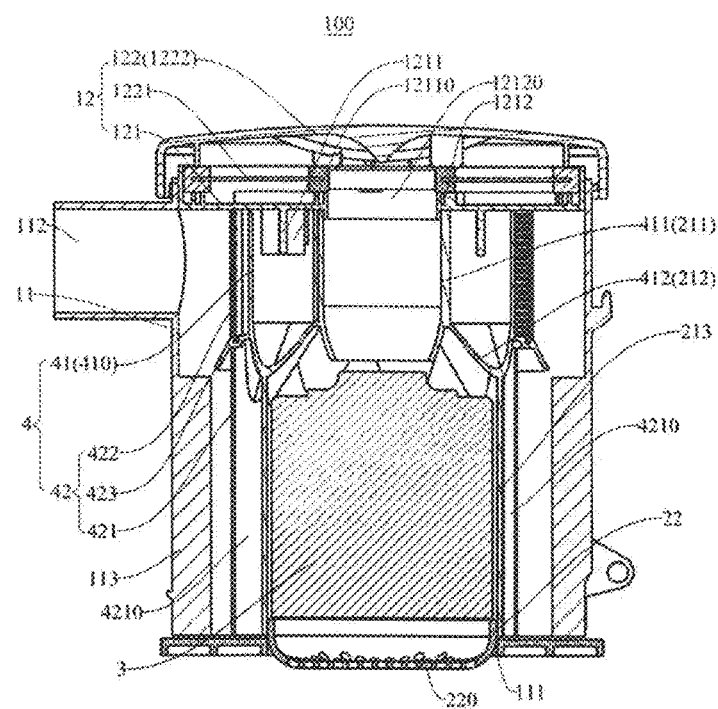
FIG. 3 is a sectional view of a dust cup assembly of a handheld cleaner according to another embodiment of the present invention.

The term "the part of the device housing 2 disposed at the opening 111" means that the part of the device housing 2 closely covers the opening 111 to make the opening 111 only in communication with the air exhaust port 220 of the part. The part may at least partially extend out of the inner chamber of the cup casing 1, as shown in FIGS. 1 and 3, so as to exhaust the airstream reliably and effectively, and improve accuracy of positioning the part of the device housing 2 with the opening to raise reliability of the dust cup assembly 100 during work.

Figure 2:
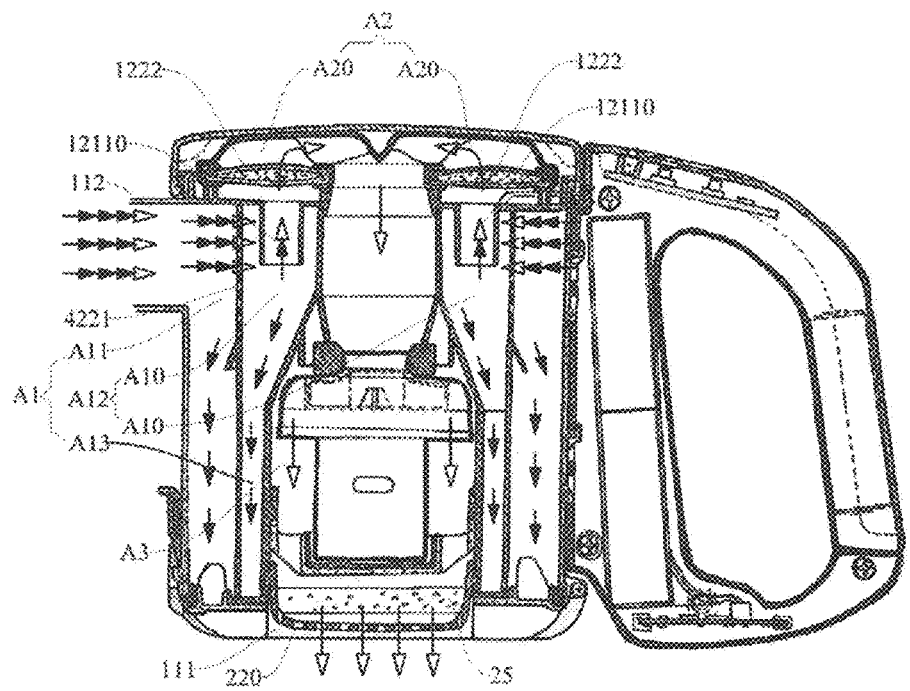
FIG. 2 is a schematic view showing a working principle of the handheld cleaner shown in FIG. 1.

Referring to FIG. 2, the cup casing 1 has a dust suction inlet 112; a dust removal chamber A1 is defined between the device housing 2 and the cup casing 1 and communicates with the dust suction inlet 112; the dust removal chamber A1 may be defined by an outer surface of the device housing 2 and an inner surface of the cup casing 1 together; and the device housing 2 defines an air exhaust chamber A3 therein that communicates the air exhaust port 220 with the dust removal chamber A1. In such a way, the dust removal chamber A1 surrounds the air exhaust chamber A3 because the dust removal chamber A1 is defined between the device housing 2 and the cup casing 1 and the air exhaust chamber A3 is defined in the device housing 2.

The negative pressure device 3 is configured to supply negative pressure to the air exhaust chamber A3, such that the dusty air in the environment may be sucked into the dust removal chamber A1 through the dust suction inlet 112 for dust and air separation, and the purified airstream separated from the dust removal chamber A1 enters the device housing 2, i.e. enters the air exhaust chamber A3 to be exhausted to the outside of the cup casing 1 through the air exhaust port 220 and the opening 111. In short, the dusty air in the environment passes through air passages (like an air passage from the dust removal chamber A1 to the air exhaust chamber A3) in the dust cup assembly 100 and hence dust in the dusty air may be filtered out and stored in the dust cup assembly 100, while the purified airstream may flow back to the environment.

Therefore, in terms of a layout of air passages in the dust cup assembly 100, the dust removal chamber A1 surrounds the air exhaust chamber A3, so the layout is more compact, which reduces suction power loss and improves energy efficiency. Moreover, since the air exhaust port 220 is formed in the device housing 2 and may directly exhaust the airstream to the outside environment via the opening 111 in the cup casing 1, an air exhaust path is shortened effectively and energy consumption is further reduced to improve the energy efficiency. Additionally, the dust suction inlet 112 is formed in the cup casing 1 and communicates with the dust removal chamber A1 defined between the cup casing 1 and the device housing 2, and the air exhaust port 220 is formed in the device housing 2 and communicates with the air exhaust chamber A3 in the device housing 2, such that the air passages have a simple layout, and are convenient to process and free of a problem of airflow short circuit, thus having high reliability of dust filtration and a good dust filtration effect.

Certainly, the present invention is not limited thereby. In other embodiments of the present invention, the air exhaust port 220 may be formed in the cup casing 1 instead of the device housing 2, and the air exhaust chamber A3 may be in communication with the air exhaust port 220 through a connecting passage, in which case the cup casing 1 may not necessarily have the opening 111 and the part of the device housing 2 may not be located at the opening 110 and exposed therefrom.

In some preferable embodiments of the present invention, the device housing 2 has a tube shape and is disposed in the cup casing 1; an outer end face (e.g. a lower end face shown in FIG. 1) of the device housing 2 at an axial side thereof abuts against or extends beyond a partial inner surface of the cup casing 1 (e.g. a lower surface shown in FIG. 1); and the dust removal chamber A1 is defined between the inner surface of the cup casing 1 and an outer peripheral surface of the device housing 2 and surrounds the device housing 2 along a circumferential direction of the device housing 2. Thus, the layout of air passages in the dust cup assembly 100 is more compact, the air exhaust path is shorter, the energy consumption is lower and the energy efficiency is higher.

Preferably, as shown in FIGS. 1 and 3, the cup casing 1 and the device housing 2 both have a tube shape, an axis of the cup casing 1 is in parallel to an axis of the device housing 2, and an outer bottom wall of the device housing 2 abuts against or penetrates through an inner bottom wall of the cup casing 1, in which case the dust removal chamber A1 may be a hollow annular-columnar chamber defined between an inner peripheral wall of the cup casing 1 and an outer peripheral wall of the device housing 2, such that when the dust suction inlet 112 is formed along a tangential direction of the dust removal chamber A1, the dust removal chamber A1 may be used as a cyclone separating chamber for cyclonic dust and air separation, so as to improve a purifying effect. Further preferably, the cup casing 1 and the device housing 2 are arranged coaxially, i.e. the axis of the tube-shaped cup casing 1 and that of the tube-shaped device housing 2 coincide with each other, and hence the dust removal chamber A1 may be a hollow annular-columnar chamber, which has a better dust and air separation effect and is conductive to mounting a cyclone separating device 4 described hereinafter.

In conclusion, the handheld cleaner 1000 according to the embodiments of the present invention is small and lightweight with a compact structure and effortless for handheld use, and the handheld cleaner 1000 has compact air passages, low energy consumption and high energy efficiency.

The extension pipe 300 according to some embodiments of the present invention will be described with reference to FIGS. 11 to 15.

Specifically, the extension pipe 300 is configured to be connected with the dust suction inlet 112 of the dust cup assembly 100. That is, when the dust cup assembly 100 needs the extension pipe 300 to suck dust, the extension pipe 300 may be assembled to the dust suction inlet 112; when the dust cup assembly 100 does not need the extension pipe 300 but another component (such as a gap nozzle a mite-killing nozzle, etc.) for dust suction, the extension pipe 300 may be detached from the dust suction inlet 112 and the other component required actually may be assembled to the dust suction inlet 112.

Figure 14:
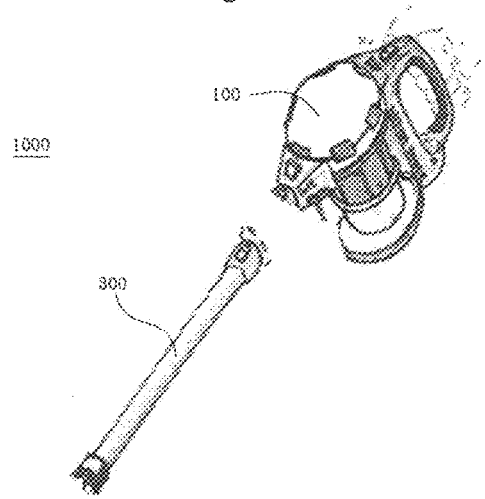
FIG. 14 is an assembling view of an extension pipe and a dust cup assembly according to some embodiments of the present invention.

In some specific examples of the present invention, referring to FIG. 14, a first end of the extension pipe 300 is directly and detachably connected with the dust suction inlet 112. For example, the extension pipe 300 may be mounted to and dismounted from the dust suction inlet 112 through a quick release snap structure, thus facilitating the mounting and dismounting thereof.

Figure 15:
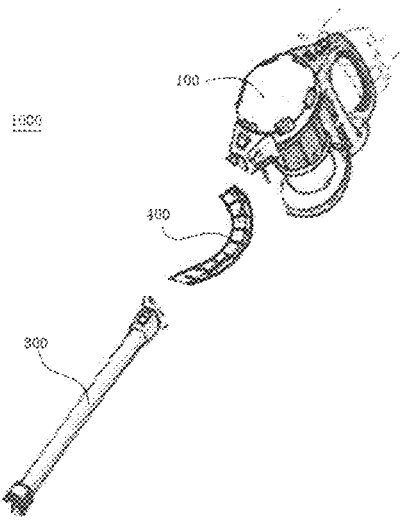
FIG. 15 is an assembling view of an extension pipe and a dust cup assembly according to some other embodiments of the present invention.

In some other specific examples of the present invention, referring to FIG. 15, the first end of the extension pipe 300 is indirectly and detachably connected with the dust suction inlet 112 through a telescopic hose 400. For example, the extension pipe 300 may be mounted to and dismounted from the telescopic hose 400 through a first quick release structure, and the telescopic hose 400 may be mounted to and dismounted from the dust suction inlet 112 through a second quick release structure, such that the extension pipe 300 may be stretched and retracted through adjustment of the telescopic hose 400. The mounting, dismounting and connecting are convenient, and a dust suction range of the handheld cleaner 1000 can be enlarged. It should be noted herein that the concept "the telescopic hose 400" is well known to those skilled in the art and hence will not be illustrated.

In some more specific examples of the present invention, referring to FIG. 15, the first end of the extension pipe 300 is in communication with the dust suction inlet 112 through the telescopic hose 400. For example, a first end of the telescopic hose 400 may extend into and be fixed in the extension pipe 300, and a second end thereof is detachably connected with the dust suction inlet 112. Thus, during assembling, the first end of the telescopic hose 400 may extend into an inner bore of the extension pipe 300 and fixed inside the extension pipe 300. Preferably, the dust cup assembly 100 has a first connecting structure, the first end of the extension pipe 300 has a second connecting structure, and the second connecting structure and the first connecting structure are detachably fitted with each other, such that when the first connecting structure and the second connecting structure are assembled together, the first end of the extension pipe 300 may be fixed to the dust cup assembly 100, and when the first connecting structure is disassembled from the second connecting structure, the extension pipe 300 may be removed from the dust cup assembly 100. For example, the first connecting structure may be a snap hook, and the second connecting structure may be a snap block.

Therefore, when the extension pipe 300 is used for cleaning, the second end of the telescopic hose 400 may be connected to the dust suction inlet 112 of the dust cup assembly 100, such that in the process of using the handheld cleaner 1000, the first end of the extension pipe 300 may be connected to a cup body 11, for example, through the quick release snap structure, if the extension pipe 300 does not needs to be stretched, and at this time the telescopic hose 400 may be completely accommodated in the extension pipe 300, but if the extension pipe 300 needs to be stretched to a long length, the extension pipe 300 may be separated from the cup body 11, and at this time the second end of the telescopic hose 400 may be pulled out and exposed from the extension pipe 300 to realize a lengthening effect.

In some embodiments of the present invention, as shown in FIG. 1, the extension pipe 300 includes a pipe body member 61 and a rotating member 62; the pipe body member 61 is a hollow pipe with two open ends and a first end thereof is configured to connected with the dust suction inlet 112; and the rotating member 62 is provided at a second end of the pipe body member 61 and rotatably connected with the pipe body member 61, that is, the rotating member 62 may rotate freely around the second end of the pipe body member 61; the rotating member 62 is provided with an inlet hole 622 in communication with an interior of the pipe body member 61, and dust in the environment may enter the pipe body member 61 through the inlet hole 622 and enter the dust suction inlet 112 along the pipe body member 61. Hence, when the rotating member 62 rotates relative to the pipe body member 61, orientation of the inlet hole 622 may be changed with respect to the pipe body member 61. Therefore, when an inclination angle of the pipe body member 61 is constant, an entrance (i.e. the orientation) of the inlet hole 622 in the rotating member 62 may be directed to a place to be cleaned by rotating the rotating member 62, such that the extension pipe 300 may clean different positions effectively, which improves an angle range of dust suction of the extension pipe 300.

Therefore, when the user adopts the extension pipe 300 for cleaning different positions via dust suction, the dust cup assembly 100 no longer needs to be lifted, lowered or inclined to adjust the inclination angle of the whole extension pipe 300; instead, only the rotating member 62 needs to pivoted to adjust the orientation of the inlet hole 622 for targeted cleaning of different positions, so as to achieve a better dust suction effect, reduce labor intensity of the user and facilitate the use of the cleaner 1000.

Figure 12:
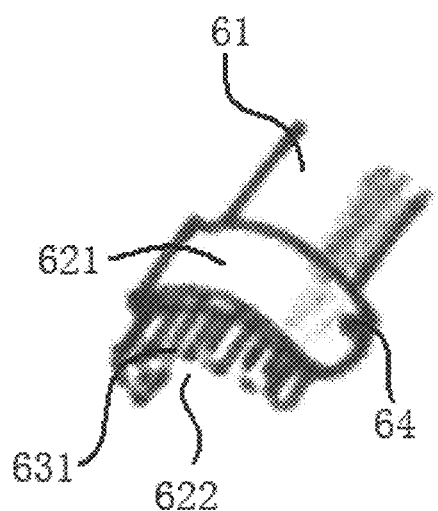
FIG. 12 is a partially enlarged view of the extension pipe shown in FIG. 11.
Figure 13:
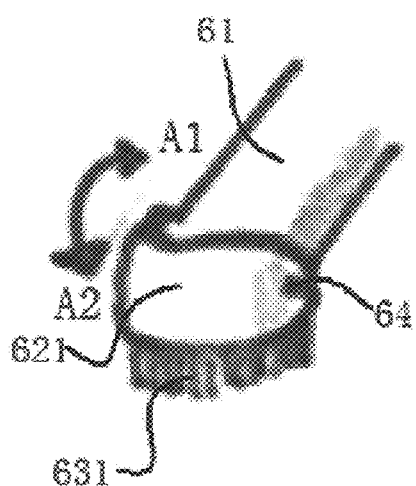
FIG. 13 is a partially enlarged view of the extension pipe of FIG. 12 in a use state.

For example, in a specific example of the present invention, as shown in FIGS. 12 and 13, when the extension pipe 300 is used for cleaning, the rotating member 62 may be rotated, for example, along a direction from A1 to A2 in FIG. 13, to rotate the inlet hole 622 to a position in perpendicular to a surface to be cleaned (as a state shown in FIG. 13), so as to improve the cleaning effect. When the extension pipe 300 is not needed for cleaning, the rotating member 62 may be rotated, for example, along a direction from A2 to A1 in FIG. 13, to rotate the inlet hole 622 to a position parallel to a central axis of the pipe body member 61 (as a state shown in FIG. 12), so as to facilitate storage thereof.

Specifically, the rotating member 62 and the pipe body member 61 are in one piece, that is, the rotating member 62 and the pipe body member 61 are connected together, regardless that the extension pipe 300 is in a use state or an unused state, so the user cannot take down the rotating member 62 from the pipe body member 61 or replace it with other components freely. Or, the second end of the pipe body member 61 has no structure configured to assemble other components, so the second end of the pipe body member 61 cannot be assembled with other components even if the rotating member 62 is disassembled from the second end of the pipe body member 61 forcibly. Thus, a problem that working flexibility of the rotating member 62 is reduced for forcible disassembling of the rotating member 62 may be avoided effectively. It should be noted herein that when the extension pipe 300 needs maintenance, a professional may forcibly detach the rotating member 62 from the pipe body member 61, which should be still understood as the technical solution where the rotating member 62 and the pipe body member 61 are in one piece.

It should be noted herein that some handheld cleaners in the related art have an extension pipe, to which various components may be mounted based on practical requirements, but the components can no longer be connected with the extension pipe firmly for repeated disassembling and assembling, thereby resulting in loose and insecure connection and decreasing service reliability and service life. However, in the present invention, the rotating member 62 and the pipe body member 61 are processed as a non-detachable one-piece structure, so as to solve the technical problem reliably and effectively.

In conclusion, as to the extension pipe 300 for the handheld cleaner 1000 according to the embodiments of the present invention, since the rotatable rotating member 62 is provided at the second end of the pipe body member 61 away from the dust suction inlet 112, suction orientation of the extension pipe 300 may be adjusted by pivoting the rotating member 62, so as to improve the angle range of dust suction of the extension pipe 300, and moreover, since the pipe body member 61 and the rotating member 62 cannot be detached from each other, operational reliability, flexibility and service life of the whole extension pipe 300 are enhanced effectively.

In the embodiments of the present invention, the rotating member 62 and the pipe body member 61 may be pivotably connected in various ways. In a first example described below, the pipe body member 61 and the rotating member 62 may be connected via a pivoting shaft 64. In a second example described below, the pipe body member 61 and the rotating member 62 are connected through spherical fit. Thus, the pivotable connection is reliable with high flexibility and is easy to realize.

Example I

Referring to FIGS. 12 and 13, the rotating member 62 includes a semi-annular portion 621, that is, the rotating member 62 has a substantially semicircular tube shape; the semi-annular portion 621 defines the inlet hole 622 extending along its axial direction and is fitted over the second end of the pipe body member 61; and two ends of the semi-annular portion 621 in its circumferential direction are connected with the pipe body member 61 through the pivoting shaft 64. Thus, the pipe body member 61 will not interfere with the rotation of the rotating member 62, which guarantees free and flexible pivoting of the rotating member 62.

Example II

This example is not shown in the drawings. The second end of the pipe body member 61 has an outer surface formed as an outer spherical surface, and the rotating member 62 has an inner surface formed as an inner spherical surface. For example, the rotating member 62 may be formed as a spherical casing and the inlet hole 622 may penetrate through the rotating member 62 along a radial direction of the rotating member 62, such that the rotating member 62 is fitted over the second end of the pipe body member 61 to make the inner spherical surface in fitted connection with the outer spherical surface. Thus, the pipe body member 61 will not interfere with the rotation of the rotating member 62, which guarantees free and flexible pivot of the rotating member 62.

Preferably, a damping member is provided between the pipe body member 61 and the rotating member 62. For example, in the first example, the damping member is provided between the semi-annular portion 621 and the pivoting shaft 64. For example, in the second example, the damping member is provided between the inner spherical surface and the outer spherical surface. Therefore, after the user pivots the rotating member 62, the rotating member 62 may stop at an angle reliably without further automatic rotation, such that the extension pipe 300 may suck dust stably and reliably towards a direction adjusted by the user, thereby further improving the dust suction effect. It should be noted herein that the damping member is a medium for increasing friction, and a specific product thereof is well known to those skilled in the art and hence will not be elaborated.

In some embodiments of the present invention, the rotating member 62 may have a cleaning member 63, such as a rag, a sponge or a bristle portion described below, such that the extension pipe 300 may do cleaning by the cleaning member 63 in the process of dust suction, so as to achieve a better cleaning effect. The cleaning member 63 may be fixed to the rotating member 62, i.e. non-detachable and Irreplaceable, or may be detachably fixed to the rotating member 62, i.e. replaceable and detachable. Thus, if a second end of the extension pipe 300 has the cleaning member 63, it is more convenient for the user to clean with a higher cleaning efficiency.

In a specific example of the present invention, the rotating member 62 has the bristle portion 631 located at an edge of the inlet hole 622. Referring to FIGS. 12 and 13, the bristle portion 631 may be connected to an axial end of the semi-annular portion 621 and extend along a circumferential direction of the semi-annular portion 621, that is, a plurality of bristles are provided at an axial end face of the semi-annular portion 621, extend out along the axial direction of the semi-annular portion 621 and are spaced apart evenly in the circumferential direction of the semi-annular portion 621. Therefore, the bristle portion 631 is arranged in a simple way and easy to realize, and the bristle portion 631 is arranged on a periphery of the inlet hole 622 and thus will not interfere with dust suction of the inlet hole 622.

In some extended embodiments of the present invention, the extension pipe 300 may be a hollow pipe with two open ends, the first end of the extension pipe 300 is detachably connected with the dust suction inlet 112, and the second end thereof has the cleaning member 63 integrally formed with the extension pipe 300, such that when the extension pipe 300 is dismounted from the dust cup assembly 100, the user may use the extension pipe 300 with the cleaning member 63 separately to do cleaning, which makes the cleaning member 63 possess an independent function from the dust cup assembly 100.

In some specific examples of the present invention, the extension pipe 300 includes the pipe body member 61 and the cleaning member 63, the cleaning member 63 is directly mounted to the second end of the pipe body member 61, and the cleaning member 63 and the pipe body member 61 are in one piece. That is, the cleaning member 63 and the pipe body member 61 are connected together, regardless that the extension pipe 300 is in the use state or the unused state, so the user cannot take down the cleaning member 63 from the pipe body member 61 or replace it with other components freely, thus avoiding a problem that service life of the cleaning member 63 is reduced due to frequent dismounting and replacement thereof. It should be noted herein that when the extension pipe 300 needs maintenance, the professional may forcibly detach the cleaning member 63 from the pipe body member 61, which should be still understood as the technical solution where the cleaning member 63 and the pipe body member 61 are in one piece.

In some other specific examples of the present invention, the extension pipe 300 includes the pipe body member 61, the rotating member 62 and the cleaning member 63, the cleaning member 63 is directly mounted to the rotating member 62 so as to be indirectly mounted to the second end of the pipe body member 61, and at this time the cleaning member 63, the rotating member 62 and the pipe body member 61 are in one piece. That is, the cleaning member 63, the rotating member 62 and the pipe body member 61 are connected together, regardless that the extension pipe 300 is in the use state or the unused state, so the user cannot take down the rotating member 62 from the pipe body member 61 or take down the cleaning member 63 from the rotating member 62, or replace them with other components freely, thus avoiding the problem that the service lives of the cleaning member 63 and the rotating member 62 are reduced due to frequent dismounting and replacement thereof. It should be noted herein that when the extension pipe 300 needs maintenance, the professional may forcibly dismount the cleaning member 63 and the rotating member 62 from the pipe body member 61, which should be still understood as the technical solution where the cleaning member 63, the rotating member 62 and the pipe body member 61 are in one piece.

In some embodiments of the present invention, the extension pipe 300 is a telescopic pipe. Thus, the extension pipe 300 may be stretched and shortened based on practical requirements, i.e. its length may be adjusted adaptively according to a distance from the place to be cleaned, which is user-friendly. It should be noted herein that a specific implementation of the telescopic pipe is well known to those skilled in the art, such as an umbrella handle and a clothes-hanging rod, both of which are telescopic pipes, and no more elaboration is provided herein.

In conclusion, according to the extended embodiments of the present invention, when the extension pipe 300 is the telescopic pipe per se, or is connected with the dust cup assembly 100 through the telescopic hose 400, the extension pipe 300 may be stretched and shortened freely and the length thereof can be adjusted, which is user-friendly; moreover, when the extension pipe 300 is connected with the dust cup assembly 100 through the telescopic hose 400, dust suction may be implemented through transition connection of the telescopic hose 400 even if the extension pipe 300 is separated from the dust cup assembly 100. Additionally, since the second end of the extension pipe 300 is provided with the cleaning member 63, the extension pipe 300 may be used separately, for example, as a broom, when it is completely dismounted from the dust cup assembly 100, thereby improving versatility of the extension pipe 300.

The dust cup assembly 100 according to some embodiments of the present invention will be described with reference to FIGS. 1 to 10.

As shown in FIGS. 1 and 2, the cup casing 1 may have a communicating chamber A2 that communicates the dust removal chamber A1 with the air exhaust chamber A3, such that the airstream separated from the dust removal chamber A1 may enter the device housing 2 through the communicating chamber A2, i.e. entering the air exhaust chamber A3. Thus, the dust removal chamber A1 and the air exhaust chamber A3 are communicated by providing the communicating chamber A2 in the cup casing 1, such that the layout of air passages in the dust cup assembly 100 is more compact, the suction power consumption is lower and the energy efficiency is higher. Certainly, the present invention is not limited thereby, i.e. the dust removal chamber A1 and the air exhaust chamber A3 may be communicated in other manners, for example, by providing a connecting pipe to communicate the dust removal chamber A1 with the air exhaust chamber A3.

Referring to FIG. 1, the cup casing 1 includes the cup body 11 and a cup cover assembly 12, in which the cup body 11 has an open end and the cup cover assembly 12 is covered on the open end of the cup body 11, such that the cup casing 1 has a simple structure and is convenient to process and assemble. Preferably, the cup cover assembly 12 is detachably covered on the open end of the cup body 11. That is, the cup cover assembly 12 is detachably connected with the cup body 11, so it is convenient to dismount the cup cover assembly 12 from the cup body 11 and clean the cup body 11 and the cup cover assembly 12. For example, the cup body 11 and the cup cover assembly 12 may be detachably connected through a thread structure or a snap structure.

In addition, in some embodiments of the present invention, the cup body 11 may further include a main body portion and a bottom cover portion, the main body portion has a tube shape with two open ends, and the bottom cover portion is connected to one open end of the main body portion in such a manner that the bottom cover portion may be opened or closed. Thus, when the bottom cover portion is opened, dust accumulating in the main body portion may be poured out, which is convenient for use.

Referring to FIG. 2, the dust suction inlet 112 and the opening 11 both may be formed in the cup body 11, and the communicating chamber A2 may be defined in the cup cover assembly 12. That is, the cup body 11 has the opening 111 and the dust suction inlet 112, the cup cover assembly 12 has the communicating chamber A2, such that the communicating chamber A2 is convenient to process, and when the communicating chamber A2 is defined in the cup cover assembly 12, the communicating chamber A2 may be located at the same side of the device housing 2 and the dust removal chamber A1 (e.g. an upper side shown in FIG. 1), so as to further simplify the layout of air passages and improve working reliability. For example, in a preferable example of the present invention, the cup body 11 has an upright tube shape, i.e. a vertically disposed tube, a top end of the cup body 1 is open to be configured as the open end, the cup cover assembly 12 is covered on the top end of the cup body 111, the dust suction inlet 112 may be formed in a side wall of the cup body 11, and the opening 111 may be formed in a bottom wall of the cup body 11. Thus, the cup casing 1 has an overall simple structure, and is convenient to process, assemble and disassemble.

It should be noted herein that the term "tube shape" is interpreted broadly, that is, a cross section of the tube shape is not limited to be circular, and sizes of various cross sections thereof may be equal or not. Additionally, the term "vertically disposed" means that an axis of the tube shape extends substantially along an up-and-down direction shown in FIG. 1, but the cup body 11 may not keep a vertical state any longer according to a change of handheld angle of the user when the handheld cleaner 1000 is used. For example, the cup body 11 may be in an oblique state or a horizontal stale.

Further, the device housing 2 is disposed in the cup body 11, the dust removal chamber A1 is defined among the cup cover assembly 12, the cup body 11 and the device housing 2, and the communicating chamber A2 is defined in the cup cover assembly 12. Hence, the dust removal chamber A1 may be communicated with the communicating chamber A2 naturally and easily, and positions of the dust removal chamber A1 and the communicating chamber A2 are arranged reasonably, such that the air passages in the dust cup assembly 100 have high non-obstruction, and the problem of airflow short circuit may be avoided.

As shown in FIGS. 1 and 2, the cup cover assembly 12 includes an inner cover 121 and an outer cover 122, the inner cover 121 and the outer cover 122 both are covered on the open end of the cup body 11 and the outer cover 122 is covered on the inner cover 121, the communicating chamber A2 is defined between the outer cover 122 and the inner cover 121, the dust removal chamber A1 is defined among the device housing 2, the inner cover 121 and the cup body 11, and the inner cover 121 has an inflow communication hole 12110 that communicates the communicating chamber A2 with the dust removal chamber A1, that is, the dust removal chamber A1 is in communication with the communicating chamber A2 through the inflow communication hole 12110 in the inner cover 121, such that the airstream separated from the dust removal chamber A1 may enter the communicating chamber A2 through the inflow communication hole 12110. Hence, the structure of the cup cover assembly 12 is simple, and the communicating chamber A2 is convenient to process.

Preferably, the inner cover 121 has an extension segment 1211 extending towards an interior of the cup body 11, and the inflow communication hole 12110 is defined by the extension segment 1211. In an example shown in FIG. 1, the inner cover 121 may be horizontally disposed at the top of the cup body 1, and the extension segment 1211 may extend downwards from the inner cover 121 into the cup body 11. Thus, the inflow communication hole 12110 has a better communicating effect, and the airstream separated from the dust removal chamber A1 may enter the communicating chamber A2 stably and reliably through the extension segment 1211.

Preferably, the inner cover 121 further has an air outlet ring 1212 extending towards the interior of the cup body 1, and the air outlet ring 1212 is fitted in or over an open end of the device housing 2 and defines an outflow communication hole 12120 that communicates the communicating chamber A2 with an interior of the device housing 2, i.e. communicates the communicating chamber A2 with the air exhaust chamber A3. In examples shown in FIGS. 1 and 2, the inner cover 121 may be horizontally disposed at the top of the cup body 11, and the air outlet ring 1212 may extend downwards from the inner cover 121 into the cup body 11 and be fitted with the open end (i.e. an air inlet end, like a top end of the device housing 2 shown in FIG. 1) of the device housing 2 through sleeve connection. Thus, the outflow communication hole 12120 has a better air outflow effect, and the airstream separated from the communicating chamber A2 may enter the air exhaust chamber A3 more stably and reliably through the air outlet ring 1212 without the problem of airflow short circuit.

In an alternative example of the present invention, the inner cover 121 and the outer cover 122 are separately and detachably mounted to the cup body 11. That is, the inner cover 121 is detachably and directly connected with the cup body 11, the outer cover 122 is also detachably and directly connected with the cup body 11, and the inner cover 121 and the outer cover 122 are not directly connected with each other. Thus, the inner cover 121 and the outer cover 122 may be directly detached from the cup body 11, so as to clean the inner cover 121 and the outer cover 122 conveniently.

In the example shown in FIG. 1, pert of the inner cover 121 is embedded in the cup body 11 and an edge thereof abuts against the open end of the cup body 11 to prevent the inner cover 121 from falling into the cup body 11; the outer cover 122 is connected with an outer wall of the open end of the cup body 11 through snap connection or threaded connection. Thus, the outer cover 122 may be detached from the cup body 11 easily, and then the inner cover 121 may be taken out of the cup body 11, so as to complete the disassembling. Hence, the structure is simple, and the dismounting and cleaning processes are convenient to implement.

In another alternative example of the present invention, which is not shown in the drawings, the inner cover 121 is detachably mounted to the outer cover 122, and one of the inner cover 121 and the outer cover 122 is detachably mounted to the cup body 11. That is, the inner cover 121 and the outer cover 122 are detachably and directly connected with each other, and one of the inner cover 121 and the outer cover 122 is detachably and directly mounted to the cup body 11. Thus, the cup cover assembly 12 may be detached from the cup body 11 directly, and then the inner cover 121 and the outer cover 122 are detached from each other, so as to clean the inner cover 121 and the outer cover 122 conveniently.

Referring to FIGS. 1 and 2, the cup cover assembly 12 further includes an in-cover filter 1221 that is detachably disposed between the inner cover 121 and the outer cover 122 and located in the communicating chamber A2, such that the airstream may be further filtered by the in-cover filter 1221 after entering the communicating chamber A2 from the dust removal chamber A1, so as to improve a dust removal effect, make cleaner air enter the air exhaust chamber A3, and ensure reliable operation of the negative pressure device 3 and provide longer service life therewith.

Preferably, the in-cover filter 1221 is detachably disposed in the communicating chamber A2. That is, the in-cover filter 1221 may be dismounted from the communicating chamber A2, thereby facilitating the cleaning and replacement of the in-cover filter 1221 and thus improving dust suction and filtration effects. In the example shown in FIG. 1, the in-cover filter 1221 may be clamped and positioned between an in-cover air passage member 1222 described below and the inner cover 121, and also, in an example shown in FIG. 3, the in-cover filter 1221 may be clamped and positioned between the inner cover 121 and the outer cover 122. Thus, after the inner cover 121 is separated from the outer cover 122, the in-cover filter 1221 may be taken out directly, so as to further improve the dismounting efficiency.

Referring to FIGS. 1 to 4, the cup cover assembly 12 further includes the in-cover air passage member 1222 that defines, together with the inner cover 121, the communicating chamber A2, so as to facilitate formation of the communicating chamber A2. In the example shown in FIG. 3, the in-cover air passage member 1222 is integrally formed to an internal wall of the outer cover 122, that is, the internal wall of the outer cover 122 may be configured as the in-cover air passage member 1222, which is convenient to process. In the example shown in FIG. 1, the in-cover air passage member 1222 is detachably disposed between the inner cover 121 and the outer cover 122, so that it is convenient to dismount and clean the in-cover air passage member 1222.

Figure 4:
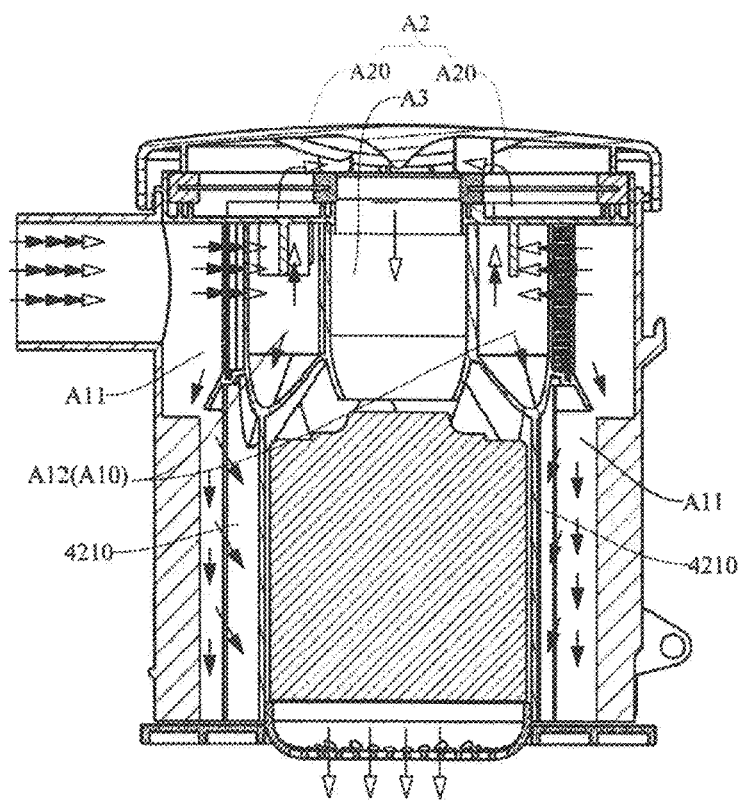
FIG. 4 is a schematic view showing a working principle of the handheld cleaner shown in FIG. 3.

Preferably, referring to FIGS. 3 and 4, the communicating chamber A2 includes a plurality of independent communication air passages A20. That is, the in-cover air passage member 1222 may be provided with a plurality of communicating grooves therein, each communicating groove and the inner cover 121 define one communication air passage A20 therebetween, and the plurality of communication air passages A20 constitute the communicating chamber A2. A plurality of inflow communication holes 12110 are provided and communicate with the plurality of communication air passages A20 correspondingly. That is, each inflow communication hole 12110 corresponds to one communication air passage A20, so the plurality of inflow communication holes 12110 may transport airstreams into the plurality of communication air passages A20 in one-to-one correspondence. Thus, the filtration effect is better.

Preferably, as shown in FIGS. 1 and 2, a plurality of in-cover filters 1221 are provided and disposed in the plurality of communication air passages A20 correspondingly, that is, the airstream entering each communication air passage A20 may be filtered by one in-cover filter 1221, so as to improve the filtration effect effectively. Certainly, the present invention is not limited thereby, because it is possible to provide only one in-cover filter 1221 having an annular shape, in which case part of the in-cover filter 1221 may be provided in each communication air passage A20, thus enhancing the filtration effect and facilitating the mounting and dismounting process.

In some embodiments of the present invention, the negative pressure device 3 in the device housing 2 may be mounted to the device housing 2, such that it is convenient to mount the negative pressure device 3 and a simple overall structure is provided. Certainly, the present invention is not limited thereby, and the negative pressure device 3 may be mounted to the cup casing 1.

In the example shown in FIG. 1, the negative pressure device 3 is mounted to the device housing 2 by a bracket 26. For example, the bracket 26 may include an upholding portion 261 and a connecting portion 262, a bottom of the negative pressure device 3 is supported on the upholding portion 261, and the connecting portion 262 is connected with the upholding portion 261 and also connected to the device housing 2. Thus, the bracket 26 has a simple structure and may fix the negative pressure device 3 in the device housing 2 stably and reliably.

Preferably, the connecting portion 262 is detachably connected with the device housing 2, so the negative pressure device 3 may be taken out from the device housing 2 by dismounting the bracket 26 from the device housing 2, so as to facilitate the maintenance and replacement of the negative pressure device 3. For example, in some preferable examples of the present invention, the connecting portion 262 and the device housing 2 both have a tube shape, and an outer peripheral wall of the connecting portion 262 and an inner peripheral wall of the device homing 2 are detachably connected through a snap structure or a thread structure, which is convenient to process and provides a better mounting and dismounting effect. It should be noted herein that in the description of the present invention, both technical solutions of the threaded connection and the snap connection are well known to those skilled in the art, which will not be elaborated.

Further, referring to FIG. 1, the bracket 26 may further include a position limiting portion 263 that is annular, fitted over the negative pressure device 3, and connected to the connecting portion 262 and/or the upholding portion 261. That is, the position limiting portion 263 is fitted with the negative pressure device 3 while limiting a position thereof on the one hand, and is connected to the connecting portion 262, or connected to the upholding portion 261, or connected to both of the connecting portion 262 and the upholding portion 261 on the other hand. In the example shown in FIG. 1, the position limiting portion 263 and the upholding portion 261 may be in one piece. Thus, the bracket 26 may fix the device housing 2 in the cup casing 1 more stably and reliably.

Referring to FIG. 1, a vibration absorbing member 264 is provided between the bracket 26 and the negative pressure device 3. Thus, even if vibration is generated in the working process of the negative pressure device 3, the vibration may be absorbed by the vibration absorbing member 264 and will not be fully transmitted to the bracket 26, so as to strengthen reliability of connection between the bracket 26 and the device housing 2. Moreover, the vibration absorbing member 264 is provided to reduce vibration noise effectively and improve comfort of using the handheld cleaner 1000.

Preferably, a part of a side surface of the vibration absorbing member 264 facing the negative pressure device 3 is spaced apart from the negative pressure device 3. In the example shown in FIG. 1, the vibration absorbing member 264 is provided with a protrusion 2641, and the negative pressure device 3 is supported on the protrusion 2641, such that pert of the side surface of the vibration absorbing member 264 that does not have the protrusion 2641 may keep a certain gap with the negative pressure device 3, thereby improving a vibration absorbing effect of the vibration absorbing member 264.

As shown in FIG. 1, the device housing 2 further has a positioning member 23 for preventing an upward displacement of the negative pressure device 3. Hence, the negative pressure device 3 is subject to an upholding force exerted by the bracket 26 to prevent the negative pressure device 3 from falling down on one hand, and also subject to a force exerted by the positioning member 23 to prevent the negative pressure device 3 from moving upwards on the other hand. Thus, the negative pressure device 3 may be disposed in the device housing 2 more stably and reliably to improve the working reliability of the negative pressure device 3.

Preferably, the positioning member 23 has a tube shape, and has a first axial end (e.g. an upper end shown in FIG. 1) in communication with the air inlet end of the device housing 2 and a second axial end (e.g. a lower end shown in FIG. 1) in communication with an air inlet end of the negative pressure device 3, such that the positioning member 23 may serve to guide the airstream and make the airstream entering the device housing 2 better blown away by the negative pressure device 3, so as to reduce resistance on air suction and exhaust, lower the energy consumption and raise the energy efficiency. Preferably, a sealing member 24 is provided at connection of the second axial end (e.g. the lower end shown in FIG. 1) of the positioning member 23 and the negative pressure device 3, so as to improve air suction capacity of the negative pressure device 3 and lower the energy consumption.

Referring to FIGS. 1 and 2, the opening 111 may be formed in the bottom wall of the cup casing 1. In such a case, a bottom of the device housing 2 is disposed at the opening 111, and the air exhaust port 220 is formed at the bottom of the device housing 2, for example, in a bottom wall of the device housing 2. That is, the bottom wall of the cup casing 1 has the opening 111, the bottom of the device housing 2 has the air exhaust port 220, and the air exhaust port 220 is disposed at and exposed from the opening 111. Thus, the airstream in the device housing 2 may be exhausted in an up-to-down direction via the air exhaust port 220 and the opening 11. That is, the airstream purified by the handheld cleaner 1000 is exhausted downwards instead of upwards or laterally, which prevents the airstream from being blown to the user, improves user experience, and hence raises comfort of using the handheld cleaner 1000.

Preferably, a plurality of air exhaust ports 220 are provided and evenly disposed in the bottom wall of the device housing 2. Thus, the handheld cleaner 1000 may exhaust the purified air more efficiently, rapidly and smoothly, so as to decrease the resistance on air suction and exhaust, lower the energy consumption and raise the overall energy efficiency of the handheld cleaner 1000.

Referring to FIGS. 1 and 2, when the device housing 2 has an upright tube shape, the device housing 2 may include a housing body 21 and a housing bottom 22, the housing body 21 has an upright tube shape, the housing bottom 22 is shaped as a bowl and connected to a bottom of the housing body 21, and the air exhaust port 220 is formed in the housing bottom 22. Thus, the device housing 2 has a simple structure, and is convenient to assemble, disassemble and process. Moreover, due to the convenient assembling and disassembling of the device housing 2, the interior of the device housing 2 may be cleaned conveniently on one hand, and the negative pressure device 3 may be maintained and replaced conveniently by the professional on the other hand.

Certainly, the present invention is not limited thereby. When the device housing 2 only has the tube shape but not vertically disposed, the device housing 2 may also include the housing body 21 and the housing bottom 22, but the housing body 21 only has the tube shape rather than the vertically disposed tube shape, and the housing bottom 22 is shaped as a bowl and connected to an axial end of the housing body 21. A case where the device housing 2 has the upright tube shape will be taken an example for explanation in the following, and those skilled in the art may understand a technical solution where the device housing 2 only has the tube shape but not vertically disposed, after reading the following technical solution.

Preferably, the housing body 21 is located in the cup casing 1 and the bottom of the housing body 21 abuts against an inner bottom wall 110 of the cup casing 1, in which case the dust removal chamber A1 only surrounds the housing body 21 rather than the housing bottom 22 along a circumferential direction of the housing body 21, so as to further enhance compactness of the layout of air passages in the dust cup assembly 100 to reduce the energy consumption for air suction and exhaust and improve the energy efficiency, and meanwhile guarantee the small and lightweight structure of the dust cup assembly 100. Additionally, the housing body 21 and the cup casing 1 are positioned in that way, thereby improving reliability of positioning the device housing 2 and the cup casing 1 effectively and facilitating the mounting and dismounting processes.

In a preferable example of the present invention, which is not shown in the drawings, the housing body 21 and the housing bottom 22 both are located in the cup casing 1, an outer bottom wall of the housing bottom 22 is fitted with the inner bottom wall 110 of the cup casing 1, and a position where the housing bottom 22 is provided with the air exhaust port 220 is opposite the opening 111, which facilitates the mounting process.

In another preferable example of the present invention, referring to FIGS. 1 and 3, the housing body 21 is located in the cup casing 1, the housing bottom 22 has an upper portion extending into the cup casing 1 to be fitted with the housing body 21 and a lower portion extending downwards out of the inner bottom wall 110 of the cup casing 1 via the opening 111, and the air exhaust port 220 in the housing bottom 22 also extends downwards out of the inner bottom wall 110 of the cup casing 1 via the opening 111, in which case the bottom of the device housing 2 extends downwards out of the inner bottom wall 110 of the cup casing 1 via the opening 111. Thus, the mounting process is convenient to implement and the positioning effect is good. Preferably, a snap connection or a threaded connection is provided between an outer peripheral wall of the housing bottom 22 and an inner peripheral wall of the housing body 21. Thus, it is convenient to assemble and disassemble the housing body 21 and the housing bottom 22.

Further, referring to FIG. 1, the dust cup assembly 100 further includes an in-housing filter 25 that is disposed in the device housing 2 and located between the air exhaust port 220 and the negative pressure device 3. That is, the airstream in the air exhaust chamber A3 is exhausted through the air exhaust port 220 after being filtered by the in-housing filter 25. Thus, the effect of purifying the exhausted air of the handheld cleaner 1000 is further improved.

In some embodiments of the present invention, referring to FIG. 3, the dust cup assembly 100 further includes the cyclone separating device 4 that is disposed in the dust removal chamber A1 and defines a cyclone separating chamber in the dust removal chamber A1. Thus, dust in the dusty air entering the dust removal chamber A1 may be thrown out in a cyclone manner in the cyclone separating chamber, so as to further improve the dust removal effect.

Preferably, in a flow direction of the airstream, the cyclone separating chamber includes multiple stages of cyclone chambers communicated successively, so the dusty air entering the dust removal chamber A1 may go through the multiple stages of cyclone chambers successively for multi-stage dust and air separations, thereby improving the dust removal effect. A two-stage cyclone separating chamber and a three-stage cyclone separating chamber will be taken as examples for explanation in the following, and after reading the following technical solution, those skilled in the art may understand a technical solution having more stages of cyclone chambers, which is not elaborated herein.

In an example shown in FIG. 4, the two-stage cyclone separating chamber includes a first-stage cyclone chamber A11 and a second-stage cyclone chamber A12, and the first-stage cyclone chamber A11 is communicated with the second-stage cyclone chamber A12 and located at the upstream of the second-stage cyclone chamber A12, such that the dusty air entering the dust removal chamber A1 first enters the first-stage cyclone chamber A11 for dust and air separation and then enters the second-stage cyclone chamber A12 for further dust and air separation. For another example, which is not shown in the drawings, the three-stage cyclone separating chamber includes a first-stage cyclone chamber, a second-stage cyclone chamber and a third-stage cyclone chamber, the first-stage cyclone chamber is communicated with the second-stage cyclone chamber and located at the upstream of the second-stage cyclone chamber, and the second-stage cyclone chamber is communicated with the third-stage cyclone chamber and located at the upstream of the third-stage cyclone chamber, such that the dusty air entering the dust removal chamber A1 first enters the first-stage cyclone chamber for dust and air separation, then enters the second-stage cyclone chamber for dust and air separation, and finally enters the third-stage cyclone chamber for dust and air separation.

Preferably, the device housing 2 has the tube shape, each stage of cyclone chamber is configured to be a hollow annular-columnar chamber, and in the flow direction of the airstream, an upstream stage of cyclone chamber surrounds a downstream stage of cyclone chamber along the circumferential direction of the device housing 2. For example, the first-stage cyclone chamber surrounds the second-stage cyclone chamber along the circumferential direction of the device housing 2, the second-stage cyclone chamber surrounds the third-stage cyclone chamber along the circumferential direction of the device housing 2, and so on. Further preferably, the most downstream stage of cyclone chamber surrounds the device housing 2 along the circumferential direction of the device housing 2. For example, as to the two-stage cyclone separating chamber, the second-stage cyclone chamber A12 surrounds the device housing 2 along the circumferential direction of the device housing 2, and as to the three-stage cyclone separating chamber, the third-stage cyclone chamber surrounds the device housing 2 along the circumferential direction of the device housing 2. Thus, the overall layout of the cyclone chambers may be compact, thereby reducing the energy consumption for air suction of the negative pressure device 3.

The cyclone separating device 4 according to some embodiments of the present invention will be described briefly in the following.

As shown in FIGS. 1 and 2, the cyclone separating device 4 defines the two-stage cyclone separating chamber and hence includes a first cyclone separating member 41 and a second cyclone separating member 42. The first cyclone separating member 41 defines the second-stage cyclone chamber A12 and hence may be called a second-stage cyclone separating member, and the second cyclone separating member 42 defines the first-stage cyclone chamber A11 and hence may be called a first-stage cyclone separating member.

Certainly, the present invention is not limited thereby. The cyclone separating device 4 may only include the first cyclone separating member 41 or the second cyclone separating member 42, in which case the cyclone separating device 4 defines an one-stage cyclone separating chamber. A case where the cyclone separating device 4 includes the first cyclone separating member 41 and the second cyclone separating member 42 simultaneously will be taken an example for explanation in the following, and after reading the following technical solution, those skilled in the art may understand a technical solution where the cyclone separating device 4 only includes the first cyclone separating member 41 or the second cyclone separating member 42.

Referring to FIGS. 3 and 4, when the device housing 2 is tube-shaped, the first cyclone separating member 41 is disposed in the dust removal chamber A1 and surrounds the device housing 2 along the circumferential direction of the device housing 2, and the negative pressure device 3 makes the dusty air enter the dust removal chamber A1 and undergo dust and air separation by the first cyclone separating member 41. Thus, when the first cyclone separating member 41 surrounds the device housing 2 along the circumferential direction of the device housing 2, the first cyclone separating member 41 may make full use of space in the dust removal chamber A1 to improve the dust and air separation effect, and the structure of the dust cup assembly 100 becomes more compact, small and lightweight.

Referring to FIGS. 3 and 4, when the device housing 2 is tube-shaped, the second cyclone separating member 42 has a tube shape and sleeved between the device housing 2 and the cup casing 1, for example, coaxially fitted over the device housing 2, and the negative pressure device 3 makes the dusty air enter the dust removal chamber A1 and undergo dust and air separation by the second cyclone separating member 42. Thus, when the second cyclone separating member 42 surrounds the device housing 2 along the circumferential direction of the device housing 2, the second cyclone separating member 42 may make full use of the space in the dust removal chamber A1 to improve the dust and air separation effect, and the structure of the dust cup assembly 100 becomes more compact, small and lightweight. In this embodiment, when the dust cup assembly 100 also includes the first cyclone separating member 41, the first cyclone separating member 41 may be located between the second cyclone separating member 42 and the device housing 2, that is, the second cyclone separating member 42 may be located between the first cyclone separating member 41 and the cup casing 1, such that the dusty air entering the dust removal chamber A1 may first undergo the dust and air separation by the second cyclone separating member 42 and then undergo the dust and air separation by the first cyclone separating member 41.

In some embodiments of the present invention, as shown in FIGS. 2 and 4, at least one stage of cyclone chamber includes a plurality of cyclone air passages A10 of the same stage, and the plurality of cyclone air passages A10 of the same stage are successively arranged along the circumferential direction of the device housing 2, such that the airstream separated from an upper stage of cyclone chamber may enter the plurality of cyclone air passages A10 to undergo independent dust and air separations, so as to further improve the dust and air separation effect and the purifying effect.

Preferably, the most downstream stage of cyclone chamber includes a plurality of cyclone air passages A10 of the most downstream stage, that are arranged successively along the circumferential direction of the device housing 2, the communicating chamber A2 includes the plurality of communication air passages A20, and the plurality of communication air passages A20 are in corresponding communication with the plurality of cyclone air passages A10 of the most downstream stage. In the example shown in FIG. 4, for the two-stage cyclone separating chamber, the second-stage cyclone chamber A12 includes the plurality of cyclone air passages A10, and for the three-stage cyclone separating chamber which is not shown in the drawings, the third-stage cyclone chamber includes the plurality of cyclone air passages A10.

The plurality of cyclone air passages A10 are in communication with the plurality of communication air passages A20 in one-to-one correspondence. In the examples shown in FIG. 3 and FIG. 4, a plurality of extension segments 1211 may be fitted in the plurality of communication air passages A20 in one-to-one correspondence, such that a plurality of inflow communication holes 12110 may communicate the plurality of cyclone air passages A10 with the plurality of communication air passages A20 in one-to-one correspondence. Hence, the filtration effect is better.

Figure 7:
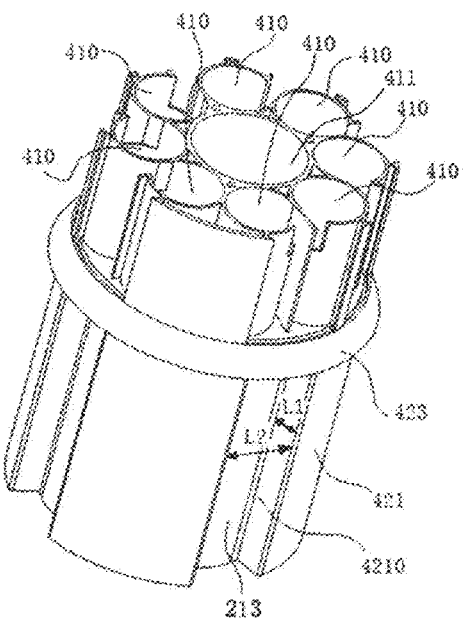
FIG. 7 is a schematic view showing a device housing and a cyclone separating device in FIG. 3, in which the device housing and the cyclone separating device are in one piece.
Figure 8:
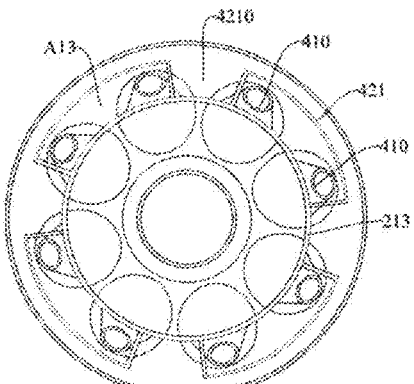
FIG. 8 is a bottom view of the device housing and the cyclone separating device shown in FIG. 7.

In some specific examples of the present invention, referring to FIGS. 3, 4 and 7, the first cyclone separating member 41 includes a plurality of cyclones 410 surrounding the device housing 2, and each cyclone 410 defines one cyclone air passage A10, such that the dusty air entering the dust removal chamber A1 may respectively enter the plurality of cyclones 410 to undergo independent dust and air separations in the cyclone manner, thereby improving the dust and air separation effect and the dust suction effect of the handheld cleaner 1000.

Preferably, as shown in FIGS. 3, 4 and 7, the cyclone 410 may have an upright tube shape, a side wall of the cyclone 410 may be opened to form an air inlet that extends along a tangential direction of the cyclone 410, a top end of the cyclone 410 may be opened to form an air outlet, a bottom end of the cyclone 410 may be opened to form a dust outlet, and the top ends of the cyclones 410 may abut against a bottom wall of the inner cover 121 and be fitted over the plurality of extension segments 1211 in one-to-one correspondence. That is, the plurality of extension segments 1211 extend into the plurality of cyclones 410 in one-to-one correspondence.

Therefore, referring to FIGS. 4 and 9, the dusty air entering the cyclone 410 from the air inlet may flow in a cyclone manner to separate dust from air, the separated dust may be exhausted from the dust outlet at the bottom end of the cyclone 410 and deposited at the bottom of the dust removal chamber A1 (for example, deposited in a secondary dust accumulating chamber A13 described hereinafter and defined between a second tube segment 213 of the device housing 2 and a separating tube portion 421 of the second cyclone separating member 42), and the separated air may be exhausted from the air outlet at the top end of the cyclone 410 and flow into the communicating chamber A2 of the cup cover assembly 12.

Preferably, as shown in FIGS. 3 and 4, the first cyclone separating member 41 includes a straight tube segment 411 and a tapered tube segment 412. For example, when the device housing 2 has the upright tube shape, the straight tube segment 411 is connected to a top of the tapered tube segment 412, and the tapered tube segment 412 has a cross section area decreased gradually in the up-to-down direction. Thus, the dusty air entering the cyclone 410 may undergo the dust and air separation more effectively and reliably while flowing in the cyclone 410 in the cyclone manner, thus improving the dust and air separation effect.

Preferably, as shown in FIGS. 3 and 7, the first cyclone separating member 41 and the device housing 2 are in one piece, which raises processing efficiency, spares a procedure of assembling the first cyclone separating member 41 with the device housing 2 to raise assembling efficiency, and lowers assembling difficulty due to high modularity, that is, the dust cup assembly 100 may be assembled easily after the user disassembles it for cleaning. Additionally, when the first cyclone separating member 41 and the device housing 2 are in one piece, the structural compactness of the dust cup assembly 100 may be enhanced to make the dust cup assembly 100 small and lightweight, dust capacity of the dust removal chamber A1 may be improved, and strength of the device housing 2 may be strengthened without increasing cost.

In an example shown in FIG. 7, the first cyclone separating member 41 may include the plurality of cyclones 410 integrally molded to the outer peripheral wall of the device housing 2 and surrounding the device housing 2, thus reducing the assembling difficulty more effectively, that is, the user may complete the assembling and disassembling of the dust cup assembly 100 very easily. It should be noted herein that "two components being in one piece" means two components are non-detachable, and that "two components being integrally molded" means that two components are molded simultaneously and configured as a whole non-detachable part.

Preferably, as shown in FIGS. 1 and 3, when the device housing 2 is tube-shaped, in an axial direction of the device housing 2, the negative pressure device 3 is at least partially located at a side of the first cyclone separating member 41. Thus, the negative pressure device 3 may make full use of space inside the device housing 2, while the first cyclone separating member 41 may make full use of space outside the device housing 2, thereby making the structure of the dust cup assembly 100 more compact. It should be noted herein that the first cyclone separating member 41 is not shown in FIGS. 1 and 2.

Alternatively, referring to FIG. 1, the negative pressure device 3 includes a fan 31 and a motor 32 connected successively along the axial direction of the device housing 2, and the motor 32 is spaced apart from the first cyclone separating member 41 in the axial direction of the device housing 2, that is, the motor 32 is completely located at the side of the first cyclone separating member 41, so as to make better use of space. Moreover, since the negative pressure device 3 is constituted by the fan 31 and the motor 32, such that the negative pressure device 3 has a simple structure and is convenient to obtain. Certainly, the present invention is not limited thereby, and the negative pressure device 3 may include other components, for example, a vacuum pump.

Referring to FIGS. 1 to 4, the device housing 2 includes a first tube segment 211, a transition tube segment 212 and a second tube segment 213, in which a maximum diameter of the first tube segment 211 is smaller than a minimum diameter of the second tube segment 213. Thus, when the device housing 2 and the cup casing 1 have the tube shape and coaxially disposed, and the dust removal chamber A1 is defined between the inner peripheral wall of the cup casing 1 and the outer peripheral wall of the device housing 2, a first portion of the dust removal chamber A1 radially opposite to the first tube segment 211 has a larger capacity than a second portion of the dust removal chamber A1 radially opposite to the second tube segment 213, and a first portion of the air exhaust chamber A3 radially opposite to the second tube segment 213 has a larger capacity than a second portion of the air exhaust chamber A3 radially opposite to the first tube segment 211.

Therefore, in a radial direction of the housing device 2, when the first cyclone separating member 41 is opposite to the first tube segment 211, or opposite to the first tube segment 211 and the transition tube segment 212, the first cyclone separating member 41 may make full use of space of the dust removal chamber A1 to improve the filtration effect on the dusty air. Meanwhile, in the radial direction of the housing device 2, when the negative pressure device 3 is opposite to the second tube segment 213, or opposite to the second tube segment 213 and the transition tube segment 212, the negative pressure device 3 may make full use of space of the air exhaust chamber A3 to improve the filtration effect on the dusty air.

Preferably, an axial length of the second tube segment 213 is greater than an axial length of the transition tube segment 212, for example, more than twice the axial length of the transition tube segment 212, but an axial length of the first tube segment 211 may be greater than or equal to the axial length of the transition tube segment 212. Thus, the first cyclone separating member 41 and the negative pressure device 3 may make better use of space, and the overall dust suction effect of the handheld cleaner 1000 may be improved.

Preferably, referring to FIG. 3, the first tube segment 211 and the second tube segment 213 both are configured as straight tube segments, and the transition tube segment 212 is a divergent tube segment, which is convenient for processing and assembling. Thus, when the first cyclone separating member 41 is integrally molded to an outer peripheral wall of the first tube segment 211 and an outer peripheral wall of the transition tube segment 212, the first cyclone separating member 41 may be naturally molded as the plurality of cyclones 410 spliced by a plurality of straight tube segments 411 and a plurality of tapered tube segments 412, which not only makes full use of the space, but also improves the dust and air separation effect.

In the example shown in FIG. 3, the housing body 21 has the upright tube shape and includes the first tube segment 211, the transition tube segment 212 and the second tube segment 213 successively in the up-to-down direction, and along this direction, a cross section area of the first tube segment 211 is equal everywhere, a cross section area of the transition tube segment 212 increases gradually, and a cross section area of the second tube segment 213 is equal everywhere. Thus, the processing is convenient, and the plurality of cyclones 410 is easy to mold.

In some embodiments of the present invention, the device housing 2 and the second cyclone separating member 42 are vertically disposed, and two axial ends of the second cyclone separating member 42 abut against an internal wall of the cup casing 1. In the examples shown in FIGS. 1 and 3, a top end the second cyclone separating member 42 abuts against a lower surface of the inner cover 121 and a bottom end thereof abuts against the inner bottom wall 110 of the cup casing 1.

Therefore, a primary annular-columnar dust removal chamber may be defined between an outer peripheral wall of the second cyclone separating member 42 and the inner peripheral wall of the cup casing 1, a secondary annular-columnar dust removal chamber may be defined between an inner peripheral wall of the second cyclone separating member 42 and the outer peripheral wall of the device housing 2, and the primary dust removal chamber surrounds the secondary dust removal chamber to defines the whole dust removal chamber together with the secondary dust removal chamber. Since the primary dust removal chamber and the secondary dust removal chamber are located outside and inside of the second cyclone separating member 42 respectively and both configured to have annular-columnar space, the layout of the dust removal chamber becomes more compact, and volumes of the primary dust removal chamber and the secondary dust removal chamber are increased to make dust and air more fully separated.

Referring to FIGS. 3 and 4, the whole primary dust removal chamber may be configured as the first-stage cyclone chamber A11, and the first cyclone separating member 41 may be disposed in the secondary dust removal chamber, i.e. between the inner peripheral wall of the second cyclone separating member 42 and the outer peripheral wall of the device housing 2, to define the second-stage cyclone chamber A12 in the secondary dust removal chamber. In such a case, rest of the secondary dust removal chamber except the second-stage cyclone chamber A12 is configured as the secondary dust accumulating chamber A13.

Preferably, referring to FIGS. 1 and 2, the second cyclone separating member 42 is vertically disposed and includes a separating tube portion 421 and a filtration tube portion 422 axially connected with the separating tube portion 421. The filtration tube portion 422 may be detachably connected to a top end of the separating tube portion 421 and define a filtration hole 4221 communicating the first-stage cyclone chamber A11 with the second-stage cyclone chamber A12. A bottom end of the separating tube portion 421 may abut against the inner bottom wall 110 of the cup casing 1 and a top end of the filtration tube portion 422 may abut against the lower surface of the inner cover 121. Hence, the second cyclone separating member 42 is formed by connecting a tube-shaped member having holes (i.e. the filtration tube portion 422) therein with a tube-shaped member having no hole (i.e. the separating tube portion 421) therein in series, such that the second cyclone separating member 42 has a simple structure and is convenient to process and manufacture.

Certainly, the present invention is not limited thereby, and the second cyclone separating member 42 may be constituted by other components, for example, by a separating tube with a plurality of notches and filter discs embedded in the plurality of notches, which will not be described in detail.

Preferably, the second cyclone separating member 42 is at least partially in one piece with the first cyclone separating member 41. That is, the second cyclone separating member 42 may be completely in one piece with the first cyclone separating member 41, or only a part of the second cyclone separating member 42 is in one piece with the first cyclone separating member 41. For example, only the separating tube portion 421 and the first cyclone separating member 41 are in one piece, while the filtration tube portion 422 and the separating tube portion 421 are detachably connected with each other. Thus, when the second cyclone separating member 42 is at least partially in one piece with the first cyclone separating member 41, the assembling and disassembling difficulty may be further lowered and the user may conveniently disassemble the dust cup assembly 100 for cleaning.

In some embodiments of the present invention, the cyclone separating device 4 is disposed in the dust removal chamber A1 and defines at least one stage of annular or columnar cyclone chamber. For example, when the cyclone separating device 4 includes the plurality of cyclones 410, the cyclone 410 may defines the columnar cyclone chamber, but when the cyclone separating device 4 includes the second cyclone separating member 42, the annular cyclone chamber may be defined between the second cyclone separating member 42 and the cup casing 1.

The cyclone separating device 4 further defines a dust collecting groove 4210 in the dust removal chamber A1 and the dust collecting groove 4210 is in communication with the cyclone chamber. Thus, when the dusty air flows in the cyclone chamber in a cyclone manner, the separated dust may accumulate in the dust collecting groove 4210 rather than be rolled up again by the flowing airstream, so as to improve the dust and air separation effect effectively.

In some preferable embodiments (not shown in the drawings) of the present invention, the dust collecting groove 4210 is defined by the cyclone separating device 4, and thus is convenient to process and realize. In a specific example, the cyclone separating device 4 includes a continuous tube-shaped filter that has a tube shape and only has the filtration hole 4221 therein (for example, the separating tube portion 421 and the filtration tube portion 422 axially connected may make up the continuous tube-shaped filter, and the filtration hole 4221 may be formed in the filtration tube portion 422). The continuous tube-shaped filter is sleeved between the device housing 2 and the cup casing 1 to define the first-stage cyclone chamber A11 together with the cup casing 1. The dust collecting groove 4210 is formed by recessing an outer peripheral surface of the continuous tube-shaped filter inwards and communicates with the first-stage cyclone chamber A11, that is, the outer peripheral surface of the continuous tube-shaped filter has a groove recessed towards its central axis and the groove may be used as the dust collecting groove 4210.

In some other preferable embodiments of the present invention, the dust collecting groove 4210 is defined by the cyclone separating device 4 and the device housing 2 together, so as to further improve the structural compactness and save space. In a specific example, referring to FIGS. 7 and 8, the cyclone separating device 4 includes a split tube-shaped filter that is sleeved between the device housing 2 and the cup casing 1 to define the first-stage cyclone chamber A11 together with the cup casing 1. The split tube-shaped filter is tube-shaped, and has the filtration hole 4221 and a plurality of splits formed by recessing a first axial end face of the split tube-shaped filter to a second axial end face thereof (i.e., the split is formed in a surface of the split tube-shaped filter and extends from an axial end of the split tube-shaped filter to another axial end thereof), such that at least part of the split tube-shaped filter is split into pieces (for example, the separating tube portion 421 and the filtration tube portion 422 axially connected may make up the split tube-shaped filter, in which the filtration hole 4221 may be formed in the filtration tube portion 422 and the separating tube portion 421 may be split into pieces). An edge of each piece that forms the split is bent and extends towards the device housing 2, and abuts against the outer peripheral surface of the device housing 2. The dust collecting groove 4210 is defined by the split of the split tube-shaped filter and the outer peripheral surface of the device housing 2, and communicates with the first-stage cyclone chamber A11. Specifically, the dust collecting groove 4210 is defined by opposite bent edges of two adjacent pieces and the outer peripheral surface of the device housing 2.

Figure 10:
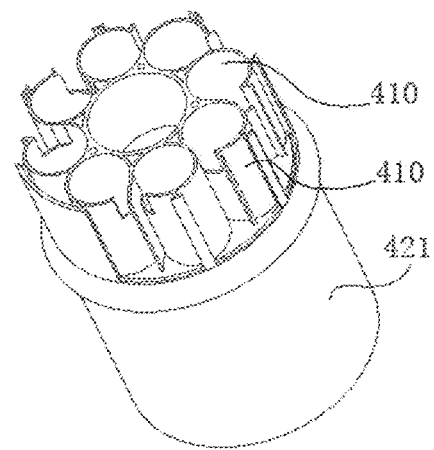
FIG. 10 is a schematic view showing a device housing and a cyclone separating device of a handheld cleaner according to another embodiment of the present invention, in which the device housing and the cyclone separating device are in one piece.
Figure 11:
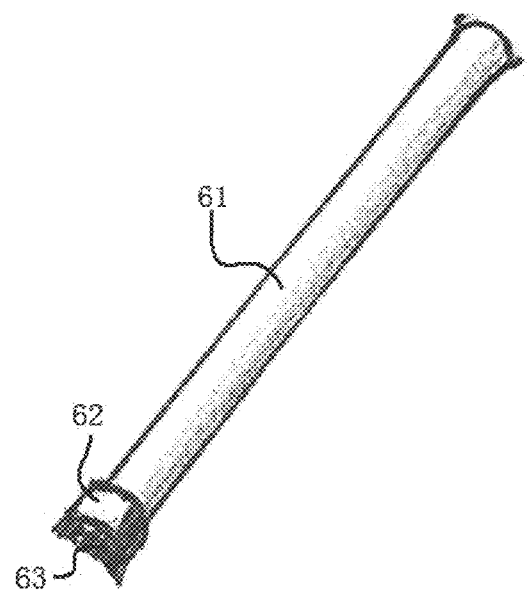
FIG. 11 is a schematic view of an extension pipe according to an embodiment of the present invention.

Certainly, the present invention is not limited thereby, and in other embodiments of the present invention, as shown in FIG. 10, the second cyclone separating member 42 may have no dust collecting groove 4210 and at this time the separating tube portion 421 may be configured to be cylindrical.

Referring to FIG. 4, preferably, the dust collecting groove 4210 extends along the axial direction of the device housing 2, and two axial ends of the dust collecting groove 4210 may be flush with two axial ends of the separating tube portion 421 respectively, that is, upper and lower ends of the dust collecting groove 4210 are flush with upper and lower ends of the separating tube portion 421 respectively, which may further improve the dust and air separation effect. Certainly, the present invention is not limited thereby, and the two axial ends of the dust collecting groove 4210 may not be flush with the two axial ends of the separating tube portion 421, in which case an axial length of the dust collecting groove 4210 is smaller than an axial length of the separating tube portion 421.

Preferably, referring to FIG. 7, a plurality of dust collecting grooves 4210 are provided and spaced apart from one another in the circumferential direction of the device housing 2, for example, three to eight dust collecting grooves 4210 being provided, so as to further improve the dust and air separation effect. Preferably, a depth L1 of the dust collecting groove 4210 in a radial direction of the first-stage cyclone separating member ranges from 8 mm to 25 mm, thus improving the dust and air separation effect. Preferably, a width L2 of the dust collecting groove 4210 in a circumferential direction of the first-stage cyclone separating member ranges from 15 mm to 35 mm, thus improving the dust and air separation effect.

Further, referring to FIG. 7, the second cyclone separating member 42 further includes an eaves ring portion 423, and the eaves ring portion 423 has an inner ring wall connected between the separating tube portion 421 and the filtration tube portion 422, and an outer ring wall obliquely extending away from a peripheral surface of the separating tube portion 421 along a direction from the filtration tube portion 422 to the separating tube portion 421. Therefore, referring to FIGS. 2 and 4, the dusty air entering the first-stage cyclone chamber A11 may undergo the dust and air separation better under guidance of the eaves ring portion 423. Moreover, the separated air may enter the second-stage cyclone chamber A12 more smoothly through the filtration tube portion 422. Furthermore, the separated dust can hardly cross the eaves ring portion 423 to enter the second-stage cyclone chamber A12 through the filtration tube portion 422, thus improving the dust and air separation effect.

Figure 5:
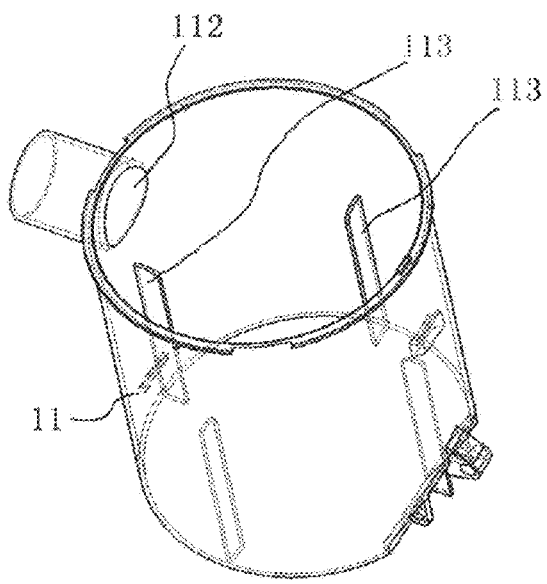
FIG. 5 is a schematic view of a part of a cup casing shown in FIG. 4.

In an embodiment of the present invention, referring to FIGS. 3 and 5, when the cup casing 1 is tube-shaped, the inner peripheral wall of the cup casing 1 (i.e. a part of the whole inner surface of the cup casing 1 that is not run through by its axis) is provided with a first dust-blocking sheet 113 extending towards an interior of the cup casing 1. Thus, when the dust moves in the first-stage cyclone chamber A1 in a cyclone manner, the dust may be blocked by the first dust-blocking sheet 113 rather than be rolled up repeatedly by the airstream to obstruct the filtration hole 4221 or enter the second-stage cyclone chamber A12, thus improving the dust and air separation effect.

Preferably, the first dust-blocking sheet 113 extends along an axial direction of the cup casing 1. Therefore, when the cup casing 1 is vertically disposed, the blocked dust may flow downwards along the first dust-blocking sheet 113 to the bottom of the cup casing 1 to prevent the dust from being rolled up repeatedly to obstruct the filtration hole 4221 or enter the second-stage cyclone chamber A12, so as to further improve the dust and air separation effect. Preferably, a plurality of first dust-blocking sheets 113 are provided and spaced apart from one another in a circumferential direction of the cup casing 1. Thus, in the whole circumferential direction of the cup casing 1, the first dust-blocking sheets 113 may serve to block the dust effectively, so as to further improve the dust and air separation effect.

Figure 6:
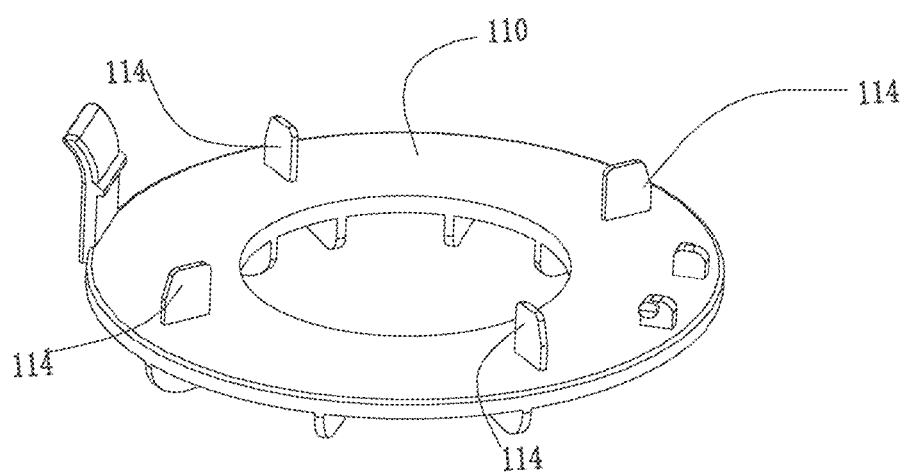
FIG. 6 is a schematic view of a rest part of the cup casing shown in FIG. 4.

In an embodiment of the present invention, referring to FIGS. 1 and 6, the cup casing 1 is tube-shaped, and an inner end wall of the cup casing 1 (i.e. one of two surfaces in the whole inner surface of the cup casing 1 that are run through by its axis) is provided with a second dust-blocking sheet 114 extending towards the interior of the cup casing 1. For example, when the cup casing 1 is vertically disposed, the second dust-blocking sheet 114 may extend upwards from the inner bottom wall 110 of the cup casing 1. Thus, when the dust moves in the first-stage cyclone chamber A11 in a cyclone manner, the dust may be blocked by the second dust-blocking sheet 114 rather than be rolled up repeatedly by the airstream to obstruct the filtration hole 4221 or enter the second-stage cyclone chamber A12, thus improving the dust and air separation effect.

Preferably, the second dust-blocking sheet 114 extends along a radial direction of the cup casing 1. Therefore, in the whole radial direction of the cup casing 1, the second dust-blocking sheet 114 may serve to block the dust effectively, so as to further improve the dust and air separation effect. Preferably, a plurality of second dust-blocking sheets 114 are provided and spaced apart from one another in the circumferential direction of the cup casing 1. Thus, in the whole circumferential direction of the cup casing 1, the second dust-blocking sheets 114 may serve to block the dust effectively, so as to further improve the dust and air separation effect.

A working principle of the dust cup assembly 100 according to an embodiment of the present invention will be described with reference to the drawings.

Figure 9:
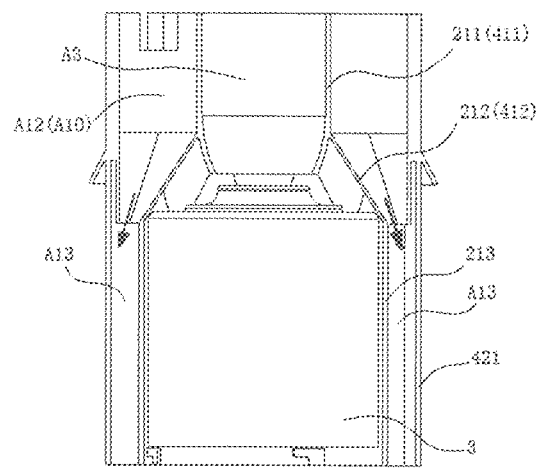
FIG. 9 is a sectional view of the device housing and the cyclone separating device shown in FIG. 7.

Referring to FIG. 2, in combination with FIGS. 4 and 9, the dusty air enters the first-stage cyclone chamber A11 from the dust suction inlet 112 along a tangential direction to undergo the cyclone dust and air separation. In this process, part of the separated dust enters and accumulates in the dust collecting groove 4210, rest of the separated dust falls down and accumulates at the bottom of the first-stage cyclone chamber A11, and the separated airstream enters the second-stage cyclone chamber A12 from the filtration hole 4221 in a tangential direction to undergo the cyclone dust and air separation. In this process, the separated dust falls down and accumulates in the secondary dust accumulating chamber A13, the separated airstream enters the communicating chamber A2 through the inflow communication hole 12110 and is filtered by the in-cover filter 1221, and the filtered airstream enters the air exhaust chamber A3 through the outflow communication hole 12120 and is exhausted from the air exhaust port 220 and the opening 111 after being filtered by the in-housing filter 25.

The handle assembly 200 according to some embodiments of the present invention will be described with reference to FIG. 1.

Specifically, the holding assembly has a user-friendly handheld feature, and may be, for example, a lift handle or a handle assembly 200. When the holding assembly is configured as the handle assembly 200, the user may control orientation of the dust cup assembly 100 conveniently. For example, it is convenient for the user to make the dust suction inlet 112 of the dust cup assembly 100 face upwards or downwards, so as to facilitate dust suction. Only the handle assembly 200 used as the holding assembly will be taken as an example for explanation in the following. Additionally, it should be noted that the structure of the lift handle is well known to those skilled in the art and hence will not be described in detail.

As shown in FIG. 1, the handle assembly 200 includes a handle casing 51 and a power supply device 52. The handle casing 51 includes a holding portion 512 for user handholding, and the power supply device 52 may be disposed in the holding portion 512, or may be disposed at a position in the handle casing 51 opposite to the holding portion 512, for example in a mounting portion 511 to be described below, such that a center of gravity of the handle assembly 200 may be optimized, i.e. close to a handheld position, and hence the user may hold the handle assembly 200 more effortlessly, which improves comfort and convenience of using the handheld cleaner 1000.

The power supply device 52 may be a battery, for example, a rechargeable battery, which is easy to realize at a low cost and convenient to use.

As shown in FIG. 1, the handle casing 51 has a finger gripping portion 510, and the mounting portion 511 and the holding portion 512 located at two sides of the finger gripping portion 510. The mounting portion 511 is used to be connected with the dust cup assembly 100 and the holding portion 512 is used for holding by hand. The power supply device 52 is disposed in the mounting portion 511 and/or in the holding portion 512. Thus, the handle casing 51 has a simple structure and is convenient to process and manufacture. Alternatively, the finger gripping portion 510 is a gripping hole to be penetrated through and gripped by fingers, the handle casing 51 is an annular housing, and the gripping hole is defined by an inner ring of the handle casing 51. Thus, it is convenient for holding, and the power supply device 52 may be mounted conveniently.

Preferably, the power supply device 52 is mounted in the mounting portion 511 and has a same length direction as the mounting portion 511. Thus, the power supply device 52 makes full use of space in the mounting portion 511 to make the handle assembly 200 miniaturized and allow the user to hold the handle assembly 200 with less effort.

Preferably, the power supply device 52 is mounted in the holding portion 512 and has a same length direction as the holding portion 512. Thus, the power supply device 52 makes full use of space in the holding portion 512 to make the handle assembly 200 miniaturized and allow the user to hold the handle assembly 200 with less effort.

Preferably, the dust cup assembly 100 is tube-shaped, the length direction of the mounting portion 511 is identical to an axial direction of the dust cup assembly 100, and the mounting portion 511 is connected to a radial side of the handle assembly 200, so as to increase a connection area between the mounting portion 511 and the dust cup assembly 100, enhance connection reliability between the handle assembly 200 and the dust cup assembly 100, and save effort for holding. Alternatively, the mounting portion 511 is detachably connected to the dust cup assembly 100. That is, the handle assembly 200 is detachably connected to the dust cup assembly 100, and thus it is convenient for mounting, dismounting, cleaning and replacement.

Further, as shown in FIG. 1, the handle casing 51 further includes a handle top 513 and a handle bottom 514 connected between the mounting portion 511 and the holding portion 512 and arranged opposite to each other. That is, the mounting portion 511, the handle top 513, the holding portion 512 and the handle bottom 514 are successively connected end to end to form the handle casing 51, such that the structure of the handle casing 51 has high reliability. Certainly, the present invention is not limited thereby. The handle casing 51 may not be annular, i.e. not include the handle top 513 and the handle bottom 514. Instead, the handle casing 51 may be I-shaped and constituted by the mounting portion 511 and the holding portion 512 arranged opposite to each other, and a bridging portion connected between the mounting portion 511 and the holding portion 512, and this example is not shown in the drawings.

Preferably, an electric control board 53 connected with the power supply device 52 may be provided in the handle top 513, the electric control board 53 connected with the power supply device 52 may be provided in the handle bottom 514, or the electric control board 53 connected with the power supply device 52 may be provided in each of the handle top 513 and the handle bottom 514 simultaneously. Thus, space in the handle casing 51 may be fully utilized.

Figure 16:
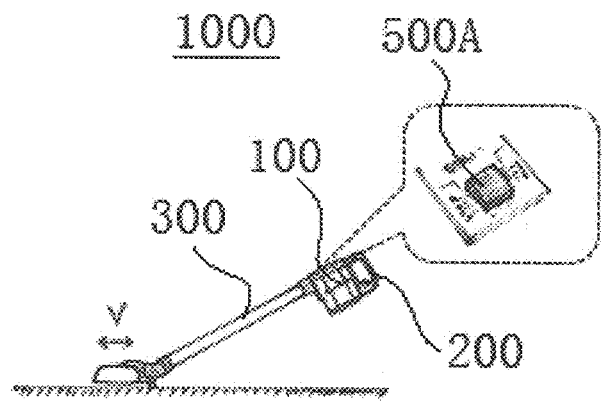
FIG. 16 is a working state diagram of a handheld cleaner according to an embodiment of the present invention, in which a detection device is exploded.
Figure 17:
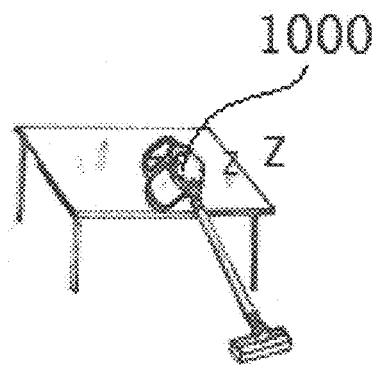
FIG. 17 is another working state diagram of a handheld cleaner according to the embodiment of the present invention.
Figure 18:
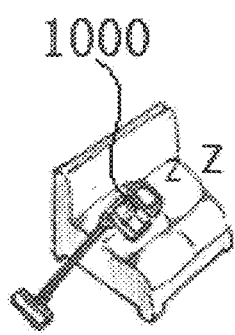
FIG. 18 is another working state diagram of a handheld cleaner according to the embodiment of the present invention.

The handheld cleaner 1000 according to some embodiments of the present invention will be described with reference to FIGS. 16 to 18, in combination with FIGS. 1 to 10.

As shown in the drawings, the handheld cleaner 1000 according to the embodiments of the present invention includes a cabinet, the negative pressure device 3, a first detection device 500A and a control device.

The cabinet may have an air intake passage that refers to a passage through which the dusty air in the environment flows after entering the cabinet but before being filtered. The negative pressure device 3 is disposed in the cabinet and used to make the dusty air outside the cabinet enter the air intake passage. For example, in a specific example of the present invention, the cabinet may include the cup casing 1 and the handle casing 51 in this description, the cup casing 1 has the dust suction inlet 112, and an inner hole of the dust suction inlet 112 defines the air intake passage. The negative pressure device 3 may include the fan 31 and the motor 323 connected with the fan 31, and suction strength of the negative pressure device 3 depends on an operating power of the motor 32. That is, the higher the operating power of the motor 32 is, the faster the fan 31 rotates and the greater the suction strength of the negative pressure device 3 is; the lower the operating power of the motor 32 is, the more slowly the fan 31 rotates and the smaller the suction strength of the negative pressure device 3 is.

The first detection device 500A is disposed to the cabinet and used to detect a motion state of the cabinet, i.e. to detect whether the cabinet is moving and how fast the cabinet moves. For example, the first detection device 500A may be an acceleration sensor or a speed sensor. The control device is connected with the first detection device 500A and the negative pressure device 3. For example, the control device may be a printed circuit board (PCB) of the handheld cleaner 1000, and configured to control a working state of the handheld cleaner 1000 according to information detected by the first detection device 500A, for example, controlling the handheld cleaner 1000 to switch to a turn-on state, a turn-off state, a standby state, a high-suction state and a lower-suction state to be described below.

Therefore, the handheld cleaner 1000 according to the embodiments of the present invention may switch to a corresponding working state automatically and intelligently according to a change of its motion state, so as to achieve the dust suction effect and an energy saving effect simultaneously.

In some specific examples of the present invention, the control device may be configured to control the negative pressure device 3 to increase the suction strength if the first detection device 500A detects that a motion speed of the cabinet rises. That is, when the first detection device 500A detects that the user moves the handheld cleaner 1000 faster, i.e., with an increasing speed, the control device increases the suction strength of the negative pressure device 3 to guarantee the dust suction effect.

In some specific examples of the present invention, the control device may be configured to control the negative pressure device 3 to decrease the suction strength if the first detection device 500A detects that the motion speed of the cabinet drops. That is, when the first detection device 500A detects that the user moves the handheld cleaner 1000 more slowly, i.e., with a decreasing speed, the control device decreases the suction strength of the negative pressure device 3 to reduce the energy consumption.

In some specific examples of the present invention, the control device may be configured to control the negative pressure device 3 to operate with a first suction strength if the first detection device 500A detects that the motion speed of the cabinet is higher than a first predetermined value, and control the negative pressure device 3 to operate with a second suction strength if the first detection device 500A detects that the motion speed of the cabinet is lower than a second predetermined value, in which the first predetermined value is greater than or equal to the second predetermined value, and the first suction strength is greater than or equal to the second suction strength. That is, when the first detection device 500A detects that the motion speed of the handheld cleaner 1000 is relatively great, the handheld cleaner 1000 may switch to the high-suction state automatically and intelligently; and when the first detection device 500A detects that the motion speed of the handheld cleaner 1000 is relatively small, the handheld cleaner 1000 may switch to the low-suction state automatically and intelligently.

Therefore, when the first detection device 500A detects that the user moves the handheld cleaner 1000 in a relatively high speed, the control device may control the negative pressure device 3 to suck dust with a relatively great suction strength, so as to guarantee the dust suction effect; when the first detection device 500A detects that the user moves the handheld cleaner 1000 in a relatively low speed, the control device may control the negative pressure device 3 to suck dust with a relatively small suction strength, so as to reduce the energy consumption.

In some specific examples of the present invention, the control device may be configured to control the negative pressure device 3 to shut down, if the first detection device 500A detects that the cabinet has never moved in a first predetermined duration (like one second). That is, when the handheld cleaner 1000 is at the turn-on state, if the user does not move the handheld cleaner 1000 in the first predetermined duration, i.e. no displacement of the handheld cleaner 1000 is detected by the first detection device 500A, the control device controls the handheld cleaner 1000 to enter the standby state where the negative pressure device 3 stops working but the first detection device 500A keeps working. Thus, when the user puts aside the handheld cleaner 1000 temporarily to do something else, the handheld cleaner 1000 may enter the standby state automatically and intelligently, so as to save unnecessary energy consumption and make it convenient for the user to continue to use the handheld cleaner 1000.

Further, the control device may be configured to control the negative pressure device 3 to turn on, if the first detection device 500A detects displacement of the cabinet in a second predetermined duration (like ten minutes) after a shutdown of the negative pressure device 3. That is, after the handheld cleaner 1000 enters the standby state, if the user moves the handheld cleaner 1000 in the second predetermined duration, i.e. the first detection device 500A detects displacement of the handheld cleaner 1000 in the second predetermined duration, the control device controls the handheld cleaner 1000 to enter the turn-on state where the negative pressure device 3 starts to work, the first detection device 500A keeps working, and the control device controls the working state of the handheld cleaner 1000 according to the information detected by the first detection device 500A. Therefore, when the user continues to use the handheld cleaner 1000, the handheld cleaner 1000 may turn on automatically and intelligently, which is user-friendly.

Further, the control device may be configured to control the handheld cleaner 1000 to turn off, if the first detection device 500A detects no displacement of the cabinet in the second predetermined duration (like ten minutes) after the shutdown of the negative pressure device 3. That is, after the handheld cleaner 1000 enters the standby state, if the user does not move the handheld cleaner 1000 in the second predetermined duration, i.e. no displacement of the handheld cleaner 1000 is detected by the first detection device 500A, the control device controls the handheld cleaner 1000 to enter the turn-off state where the negative pressure device 3 stops working, the first detection device 500A stops working, and the control device no longer controls the working state of the handheld cleaner 1000 according to the information detected by the first detection device 500A. Therefore, when the user leaves the handheld cleaner 1000 and forgets to turn it off, the handheld cleaner 1000 may turn off automatically and intelligently, thus saving the unnecessary energy consumption.

It should be noted herein that the first predetermined value and the second predetermined value may be set according to practical requirements, for example, preset by a designer before the handheld cleaner 1000 leaves the factory, or set and adjusted by the user after the handheld cleaner 1000 leaves the factory. Meanwhile, the first suction strength and the second suction strength may be set according to practical requirements, for example, preset by the designer before the handheld cleaner 1000 leaves the factory, or set and adjusted by the user after the handheld cleaner 1000 leaves the factory.

It should be noted herein that the first predetermined duration and the second predetermined duration may be set according to practical requirements, for example, preset by a designer before the handheld cleaner 1000 leaves the factory, or set and adjusted by the user after the handheld cleaner 1000 leaves the factory.

It should be noted herein that "the turn-on state" means that the handheld cleaner 1000 may conduct dust suction and switch to a corresponding working state by detecting the motion state thereof; "the standby state" means that the handheld cleaner 1000 cannot conduct dust suction; and "the turn-off state" means that the handheld cleaner 1000 can neither conduct dust suction nor switch to the corresponding working state by detecting the motion state thereof.

In some embodiments of the present invention, the handheld cleaner 1000 includes a control key connected with the control device. The control key is configured to control the control device to start controlling the working state of the handheld cleaner 1000 according to the information detected by the first detection device 500A after being trigged by an odd number of times (like the first time, the third time, the fifth time, etc.), and configured to control the control device to stop controlling the working state of the handheld cleaner 1000 according to the information detected by the first detection device 500A after being trigged by an even number of times (like the second time, the fourth time, the sixth time, etc.). The control key may be disposed to the cabinet or other positions, for example, being configured as a virtual key of a phone application.

That is, only after the user triggers the control key by the odd number of times, can the control device start controlling the working state of the handheld cleaner 1000 according to the information detected by the first detection device 500A, i.e. entering an energy-saving mode. Before the user triggers the control key or when the user triggers the control key by the even number of times, the control device will not control the working state of the handheld cleaner 1000 according to the information detected by the first detection device 500A, i.e. stopping the energy-saving mode, even if the first detection device 500A performs the detection. Thus, the user is offered more options and enjoys using the handheld cleaner 1000. Moreover, the switching between entering the energy-saving mode and stopping the energy-saving mode can be realized by triggering one control key different times, which saves space occupied by the control key and improves simplicity.

In some other embodiments of the present invention, the handheld cleaner 1000 further includes a turn-on control key and a turn-off control key. The turn-on control key is connected with the control device and configured to control the control device to start controlling the working state of the handheld cleaner 1000 according to the information detected by the first detection device 500A after being trigged. The turn-off control key is connected with the control device and configured to control the control device to stop controlling the working state of the handheld cleaner 1000 according to the information detected by the first detection device 500A after being trigged. The turn-on control key and the turn-off control key may be disposed to the cabinet and other positions, for example, be configured as virtual keys of a phone application.

That is, only after the user triggers the turn-on control key, can the control device start controlling the working state of the handheld cleaner 1000 according to the information detected by the first detection device 500A, i.e. entering the energy-saving mode. After the user triggers the turn-off control key, the control device will not control the working state of the handheld cleaner 1000 according to the information detected by the first detection device 500A, i.e. stopping the energy-saving mode, even if the first detection device 500A performs the detection. Thus, the user is offered more options and enjoys using the handheld cleaner 1000. Moreover, the switching between entering the energy-saving mode and stopping the energy-saving mode can be realized by the turn-on control key and the turn-off control key, which improves accuracy and reliability of operations and reduces the probability of misoperations.

In conclusion, in some specific embodiments of the present invention, by providing the handheld cleaner 1000 with a sensor chip for detecting displacement, speed or acceleration, a main PCB may automatically control the motor 32 to work with a small power when the handheld cleaner 1000 moves at a low motion speed for cleaning, so as to reduce an output power of the handheld cleaner 1000, and the main PCB may also automatically control the motor 32 to work with a large power when the handheld cleaner 1000 moves at a high motion speed for cleaning, so as to increase the output power of the handheld cleaner 1000, thus improving dust suction capacity and efficiency and saving energy. Meanwhile, if the handheld cleaner 1000 has no displacement in a preset duration (like one second), the handheld cleaner 1000 may enter the standby state automatically; when the handheld cleaner 1000 is in the standby state, if the displacement thereof happens, the handheld cleaner 1000 may switch to the turn-on state, but if no displacement thereof happens during a certain period of time (like ten minutes), the handheld cleaner 1000 may turn off automatically, i.e. entering the turn-off state, so as to achieve the energy-saving effect. Thus, the handheld cleaner 1000 according to embodiments of the present invention may provide the improved dust suction efficiency and the energy-saving effect.

A method for controlling the handheld cleaner 1000 according to some extended embodiments of the present invention will be described in detail.

Specifically, the method may include the following steps.

First, (step A) the motion state of the handheld cleaner 1000 is detected, i.e. it is detected whether the handheld cleaner 1000 is moving and how fast the handheld cleaner 1000 moves. Then, (step B) the working state of the handheld cleaner 1000 is controlled according to the detected motion state. For example, the handheld cleaner 1000 is controlled to switch to the turn-on state, the turn-off state, the standby state, the high-suction state and the lower-suction state described above. Thus, with the method for controlling the handheld cleaner 1000 according to the embodiments of the present invention, it is possible to make the handheld cleaner 1000 switch to the corresponding working state by detecting the motion state of the handheld cleaner 1000, so as to combine the dust suction effect and the energy-saving effect.

It should be noted herein that step A may be realized by the first detection device 500A described above, and certainly may be realized in other manners. For example, the handheld cleaner 1000 may be provided with a GPS, and the motion state of the handheld cleaner 1000 is detected by a terminal connected with the GPS. Certainly, the present invention is not limited thereby, and for example, a camera device may be provided indoors to shoot the handheld cleaner 1000, and the motion state of the handheld cleaner 1000 may be detected by a terminal connected with the camera device. Step B may be realized by the control device described above, and certainly may be realized in other manners. For example, the control in step B may be realized by a remote terminal or a remote control device.

In some embodiments of the present invention, the method for controlling the handheld cleaner 1000 may further include: controlling the handheld cleaner 1000 to increase the suction strength when it is detected that the motion speed of the handheld cleaner 1000 rises. That is, when it is detected that the user moves the handheld cleaner 1000 faster, i.e., with an increasing speed, the handheld cleaner 1000 is controlled to increase the suction strength, so as to guarantee the dust suction effect.

In some embodiments of the present invention, the method for controlling the handheld cleaner 1000 may further include: controlling the handheld cleaner 1000 to decrease the suction strength when it is detected that the motion speed of the handheld cleaner 1000 drops. That is, when it is detected that the user moves the handheld cleaner 1000 more slowly, i.e., with a decreasing speed, the handheld cleaner 1000 is controlled to decrease the suction strength, so as to reduce the energy consumption.

In some embodiments of the present invention, the method for controlling the handheld cleaner 1000 may further include: controlling the handheld cleaner 1000 to operate with the first suction strength when it is detected that the motion speed of the handheld cleaner 1000 is higher than the first predetermined value. That is, when it is detected that the user moves the handheld cleaner 1000 at a relatively high speed, the handheld cleaner 1000 is controlled to switch to the high-suction state, and thus the handheld cleaner 1000 may suck dust with a relatively great suction strength, so as to guarantee the dust suction effect.

In some embodiments of the present invention, the method for controlling the handheld cleaner 1000 may further include: controlling the handheld cleaner 1000 to operate with the second suction strength when it is detected that the motion speed of the handheld cleaner 1000 is lower than the second predetermined value. That is, when it is detected that the user moves the handheld cleaner 1000 at a relatively low speed, the handheld cleaner 1000 is controlled to switch to the low-suction state, and thus the handheld cleaner 1000 may suck dust with a relatively small suction strength to reduce the energy consumption.

In some embodiments of the present invention, the method for controlling the handheld cleaner 1000 may further include: controlling the handheld cleaner 1000 to enter the standby state, if no displacement of the handheld cleaner 1000 is detected in the first predetermined duration (like one second), when the handheld cleaner 1000 is in the turn-on state.

That is, when the handheld cleaner 1000 is in the turn-on state, if it is detected that the user has never moved the handheld cleaner 1000 in the first predetermined duration (for example, the user puts aside the handheld cleaner 1000 to do something else), the handheld cleaner 1000 may be controlled to enter the standby state, so as to save unnecessary energy consumption and make it convenient for the user to continue to use the handheld cleaner 1000.

Further, the method for controlling the handheld cleaner 1000 may further include: controlling the handheld cleaner 1000 to enter the turn-on state, if it is detected that the handheld cleaner 1000 has a displacement in the second predetermined duration, when the handheld cleaner 1000 is in the standby state. That is, when the handheld cleaner 1000 is in the standby state, if it is detected that the user moves the handheld cleaner 1000 in the second predetermined duration (for example, the user continues to use the handheld cleaner 1000), the handheld cleaner 1000 may be controlled to enter the turn-on state again, which is user-friendly.

Further, the method for controlling the handheld cleaner 1000 may further include: controlling the handheld cleaner 1000 to enter the turn-off state, if no displacement of the handheld cleaner 1000 is detected in the second predetermined duration, when the handheld cleaner 1000 is in the standby state. That is, when the handheld cleaner 1000 is in the standby state, if it is detected that the user has never moved the handheld cleaner 1000 in the second predetermined duration (for example, the user leaves the handheld cleaner 1000 and forgets to turn it off), the handheld cleaner 1000 may be controlled to enter the turn-off state, so as to save the unnecessary energy consumption.

In some embodiments of the present invention, the method for controlling the handheld cleaner 1000 may further include: receiving an instruction of turning on the energy-saving mode, and starting to control the working state of the handheld cleaner 1000 according to the detected motion state thereof after receiving the instruction. That is, only after the instruction of turning on the energy-saving mode is received, can the working state of the handheld cleaner 1000 be controlled according to the detected information, i.e. entering the energy-saving mode. Thus, the user may be offered more options and enjoy using the handheld cleaner 1000.

In some embodiments of the present invention, the method for controlling the handheld cleaner 1000 may further include: receiving an instruction of turning off the energy-saving mode, and stopping controlling the working state of the handheld cleaner 1000 according to the detected motion state thereof after receiving the instruction. That is, after the instruction of turning off the energy-saving mode is received, the handheld cleaner 1000 cannot be controlled to switch the working state thereof, i.e. cannot enter the energy-saving mode, even if the information is detected. Thus, actual requirements of the user may be satisfied better.

In some specific examples of the present invention, reception of the instruction of turning on the energy-saving mode and reception of the instruction of turning off the energy-saving mode may be integrated into one key, for example, into the control key described above. When the control key is triggered by the odd number of times (like the first time, the third time, the fifth time, etc.), the instruction of turning on the energy-saving mode is received to make the handheld cleaner 1000 enter the energy-saving mode; when the control key is triggered by the even number of times (like the second time, the fourth time, the sixth time, etc.), the instruction of turning off the energy-saving mode is received to make the handheld cleaner 1000 stop the energy-saving mode.

In some specific examples of the present invention, the reception of the instruction of turning on the energy-saving mode and the reception of the instruction of turning off the energy-saving mode may be integrated into two keys respectively, for example into the turn-on control key and the turn-off control key described above. When the turn-on control key is triggered, the instruction of turning on the energy-saving mode is received to make the handheld cleaner 1000 enter the energy-saving mode; when the turn-off control key is triggered, the instruction of turning off the energy-saving mode is received to make the handheld cleaner 1000 stop the energy-saving mode.

Figure 19:
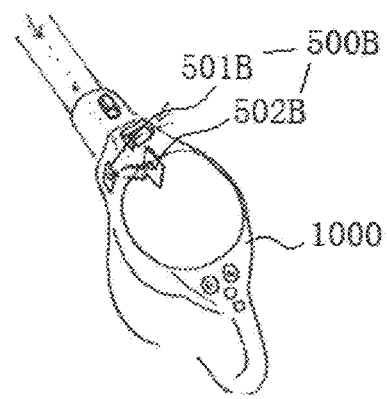
FIG. 19 is a schematic view of a handheld cleaner according to some embodiments of the present invention.

The handheld cleaner 1000 according to some embodiments of the present invention will be described with reference to FIG. 19, in combination with FIGS. 1 to 10.

As shown in the drawings, the handheld cleaner 1000 according to the embodiments of the present invention includes the cabinet, the negative pressure device 3, a second detection device 500B and a control device.

The cabinet may have the air intake passage that refers to a passage through which the dusty air in the environment flows after entering the cabinet but before being filtered. The negative pressure device 3 is disposed in the cabinet and used to make the dusty air outside the cabinet enter the air intake passage. For example, in a specific example of the present invention, the cabinet may include the cup casing 1 and the handle casing 51 in this description, the cup casing 1 has the dust suction inlet 112, and the inner hole of the dust suction inlet 112 defines the air intake passage. The negative pressure device 3 may include the fan 31 and the motor 323 connected with the fan 31, and suction strength of the negative pressure device 3 depends on an operating power of the motor 32. That is, the higher the operating power of the motor 32 is, the faster the fan 31 rotates and the greater the suction strength of the negative pressure device 3 is; the lower the operating power of the motor 32 is, the more slowly the fan 31 rotates and the smaller the suction strength of the negative pressure device 3 is.

The second detection device 500B is disposed to the cabinet and used to detect a dust concentration in the air intake passage, in which the term "dust concentration in the air intake passage" refers to a dust concentration at a certain section of the air intake passage, or an average dust concentration in a certain segment of sections of the air intake passage, or an average dust concentration in the whole air intake passage. "The dust concentration at the certain section" refers to a ratio of an area occupied by the dust contained in the dusty air within the certain section to an area of the certain section.

In a specific example of the present invention, the second detection device 500B may include an emitter 501B and a receiver 502B, and the emitter 501B is disposed opposite to the receiver 502B, such that the dust entering the air intake passage may go through a space between the emitter 501B and the receiver 502B. The emitter 501B and the receiver 502B may be disposed at two sides in the air intake passage respectively, for example, disposed in the dust suction inlet 112 and located at two diametrical ends of the dust suction inlet 112 respectively.

The emitter 501B may be used to emit light to the receiver 502B, and the receiver 502B may be used to receive the light emitted by the emitter 501B. When the dusty airstream flows through the space between the emitter 501B and the receiver 502B, the dust may block some light from being received by the receiver 502B, so the amount of light received by the receiver 502B decreases. In such a way, when a large amount of dust flows through the space between the emitter 501B and the receiver 502B, i.e., the dust centration of the dusty air that flows through the space between the emitter 501B and the receiver 502B is relatively high, the amount of light received by the receiver 502B is small; when a small amount of dust flows through the space between the emitter 501B and the receiver 502B, i.e., the dust centration of the dusty air that flows through the space between the emitter 501B and the receiver 502B is relatively low, the amount of light received by the receiver 502B is large. Thus, the dust centration of the dusty air that flows through the space between the emitter 5018B and the receiver 502B may be judged simply and reliably according to the amount of light received by the receiver 502B. It should be noted that structures of the emitter 501B and the receiver 502B are well known to those skilled in the art and hence will not be described in detail.

Certainly, the present invention is not limited thereby, and the second detection device 500B may be configured as other devices. In another specific example of the present invention, the second detection device 500B may be an image detection system, for example, including a camera and a data terminal. The camera may shoot a dust condition in the air intake passage, and the data terminal may obtain the dust concentration in the air intake passage through computation and analysis according to image information shot by the camera. In one more specific example of the present invention, the second detection device 500B may be a weight detection system, for example, including a sensitive scale and a data terminal, and the sensitive scale may be disposed at a bottom of the air intake passage to monitor a weight change in the air intake passage. Since dust is heavier than air, the weight change in the air intake passage mainly reflects a dust weight change, and then the data terminal may obtain the dust concentration in the air intake passage through computation and analysis according to weight information measured by the sensitive scale.

The control device is connected with the second detection device 500B and the negative pressure device 3. For example, the control device may be the PCB of the handheld cleaner 1000, and configured to control the working state of the handheld cleaner 1000 according to the information detected by the second detection device 500B, for example, controlling the handheld cleaner 1000 to switch to the high-suction state or the lower-suction state. Therefore, the handheld cleaner 1000 according to the embodiments of the present invention may switch to the corresponding working state automatically and intelligently according to changes of the dust concentration in the air intake passage, so as to achieve the dust suction effect and the energy-saving effect simultaneously.

In some specific examples of the present invention, the control device may be configured to control the negative pressure device 3 to increase the suction strength thereof if the second detection device 500B detects that the dust concentration rises. That is, when the second detection device 500B detects that the dust concentration in the air intake passage becomes high, the control device increases the suction strength of the negative pressure device 3 to guarantee the dust suction effect.

In some specific examples of the present invention, the control device may be configured to control the negative pressure device 3 to decrease the suction strength thereof if the second detection device 500B detects that the dust concentration drops. That is, when the second detection device 500B detects that the dust concentration in the air intake passage becomes low, the control device decreases the suction strength of the negative pressure device 3 to reduce the energy consumption.

In some specific examples of the present invention, the control device may be configured to control the negative pressure device 3 to operate with a first suction strength if the second detection device 500B detects that the dust concentration is higher than a first preset value, and control the negative pressure device 3 to operate with a second suction strength if the second detection device 500B detects that the dust concentration is lower than a second preset value, in which the first preset value is greater than or equal to the second preset value, and the first suction strength is greater than or equal to the second suction strength. That is, when the second detection device 500B detects that the dust concentration in the air intake passage is relatively high, the handheld cleaner 1000 may switch to the high-suction state automatically and intelligently; and when the second detection device 500B detects that the dust concentration in the air intake passage is relatively low, the handheld cleaner 1000 may switch to the low-suction state automatically and intelligently.

Therefore, when there is much dust on the surface to be cleaned, i.e. when the second detection device 500B detects that the dust concentration in the air intake passage is relatively high, the control device may control the negative pressure device 3 to suck dust with relatively great suction strength, so as to guarantee the dust suction effect; when there is little dust on the surface to be cleaned, i.e. when the second detection device 500B detects that the dust concentration in the air intake passage is relatively low, the control device may control the negative pressure device 3 to suck dust with relatively small suction strength, so as to reduce the energy consumption.

It should be noted herein that the first preset value and the second preset value may be set according to practical requirements, for example, preset by the designer before the handheld cleaner 1000 leaves the factory, or set and adjusted by the user after the handheld cleaner 1000 leaves the factory. Meanwhile, the first suction strength and the second suction strength may be set according to practical requirements, for example, predetermined by the designer before the handheld cleaner 1000 leaves the factory, or set and adjusted by the user after the handheld cleaner 1000 leaves the factory.

In some embodiments of the present invention, the handheld cleaner 1000 includes a control key connected with the control device. The control key is configured to control the control device to start controlling the working state of the handheld cleaner 1000 according to the information detected by the second detection device 500B after being trigged by an odd number of times (like the first time, the third time, the fifth time, etc.), and configured to control the control device to stop controlling the working state of the handheld cleaner 1000 according to the information detected by the second detection device 500B after being trigged by an even number of times (like the second time, the fourth time, the sixth time, etc.). The control key may be disposed to the cabinet or other positions, for example, being configured as a virtual key of a phone application.

That is, only after the user triggers the control key by the odd number of times, can the control device start controlling the working state of the handheld cleaner 1000 according to the information detected by the second detection device 500B, i.e. entering the energy-saving mode. Before the user triggers the control key or when the user triggers the control key by the even number of times, the control device will not control the working state of the handheld cleaner 1000 according to the information detected by the second detection device 500B, i.e. stopping the energy-saving mode, even if the second detection device 500B performs the detection. Thus, the user is offered more options and enjoys using the handheld cleaner 1000. Moreover, the switching between entering the energy-saving mode and stopping the energy-saving mode can be realized by triggering one control key different times, which saves space occupied by the control key and improves simplicity.

In some other embodiments of the present invention, the handheld cleaner 1000 further includes a turn-on control key and a turn-off control key. The turn-on control key is connected with the control device and configured to control the control device to start controlling the working state of the handheld cleaner 1000 according to the information detected by the second detection device 500B after being trigged. The turn-off control key is connected with the control device and configured to control the control device to stop controlling the working state of the handheld cleaner 1000 according to the information detected by the second detection device 500B after being trigged. The turn-on control key and the turn-off control key may be disposed to the cabinet and other positions, for example, being configured as virtual keys of a phone application.

That is, only after the user triggers the turn-on control key, can the control device start controlling the working state of the handheld cleaner 1000 according to the information detected by the second detection device 500B, i.e. entering the energy-saving mode; after the user triggers the turn-off control key, the control device will not control the working state of the handheld cleaner 1000 according to the information detected by the second detection device 500B, i.e. stopping the energy-saving mode, even if the second detection device 500B performs the detection. Thus, the user is offered more options and enjoys using the handheld cleaner 1000. Moreover, the switch between entering the energy-saving mode and stopping the energy-saving mode can be realized by the turn-on control key and the turn-off control key, which improves accuracy and reliability of operations and reduce the probability of misuse.

In conclusion, in the handheld cleaner 1000 according to some specific embodiments of the present invention, an emitting sensor and a receiving sensor are respectively provided at two sides of an air passage, through which the sucked dust passes, so that when the dust passes through the air passage between the two sensors, the sensors may perceive the amount of dust and transmit a signal indicating the amount of dust to the main PCB, and thus the main PCB adjusts the power output by the motor 32 according to the signal, thereby improving the dust suction efficiency and saving energy.

Another method for controlling the handheld cleaner 1000 according to some extended embodiments of the present invention will be described in detail.

Specifically, the method may include the following steps.

First, (step A) a concentration of dust sucked into the handheld cleaner 1000 is detected, i.e. the dust concentration in the air intake passage of the handheld cleaner 1000 is detected. Then, (step B) the working state of the handheld cleaner 1000 is controlled according to the detected dust concentration. For example, the handheld cleaner 1000 is controlled to switch to the high-suction state or the low-suction state described above. Thus, according to the method for controlling the handheld cleaner 1000 according to the embodiments of the present invention, it is possible to make the handheld cleaner 1000 switch to the corresponding working state according to changes of the dust concentration in the air intake passage, so as to combine the dust suction effect and the energy-saving effect.

It should be noted herein that step A may be realized by the second detection device 500B described above, and certainly may be realized in other manners. For example, the handheld cleaner 1000 may be provided with a camera device for shooting a dust condition on the surface to be cleaned, and the concentration of dust sucked into the handheld cleaner 1000 may be judged by a terminal connected with the camera device. Step B may be realized by the control device described above, and certainly may be realized in other manners. For example, the control in step B may be realized by a remote terminal or a remote control device.

In some embodiments of the present invention, the method for controlling the handheld cleaner 1000 may further include: controlling the handheld cleaner 1000 to increase the suction strength when it is detected that the concentration of dust sucked into the handheld cleaner 1000 rises. That is, when it is detected that the concentration of dust sucked into the handheld cleaner 1000 becomes high, the handheld cleaner 1000 is controlled to increase the suction strength, so as to guarantee the dust suction effect.

In some embodiments of the present invention, the method for controlling the handheld cleaner 1000 may further include: controlling the handheld cleaner 1000 to decrease the suction strength when it is detected that the concentration of dust sucked into the handheld cleaner 1000 drops. That is, when it is detected that the concentration of dust sucked into the handheld cleaner 1000 becomes low, the handheld cleaner 1000 is controlled to decrease the suction strength, so as to reduce the energy consumption.

In some embodiments of the present invention, the method for controlling the handheld cleaner 1000 may further include: controlling the negative pressure device 3 to operate with the first suction strength when it is detected that the dust concentration is higher than the first preset value. That is, when it is detected that the dust concentration is relatively high, i.e. there is much dust on the surface to be cleaned, the handheld cleaner 1000 is controlled to switch to the high-suction state, and thus the handheld cleaner 1000 may suck dust with a relatively great suction strength, so as to guarantee the dust suction effect.

In some embodiments of the present invention, the method for controlling the handheld cleaner 1000 may further include: controlling the negative pressure device 3 to operate with the second suction strength when it is detected that the dust concentration is lower than the second preset value. That is, when it is detected that the dust concentration is relatively low, i.e. there is little dust on the surface to be cleaned, the handheld cleaner 1000 is controlled to switch to the low-suction state, and thus the handheld cleaner 1000 may suck dust with a relatively small suction strength, so as to reduce the energy consumption.

In some embodiments of the present invention, the method for controlling the handheld cleaner 1000 may further include: receiving an instruction of turning on the energy-saving mode, and starting to control the working state of the handheld cleaner 1000 according to the detected dust concentration after receiving the instruction. That is, only after the instruction of turning on the energy-saving mode is received, can the working state of the handheld cleaner 1000 be controlled according to the detected information, i.e. entering the energy-saving mode. Thus, the user may be offered more options and enjoy using the handheld cleaner 1000.

In some embodiments of the present invention, the method for controlling the handheld cleaner 1000 may further include: receiving an instruction of turning off the energy-saving mode, and stopping controlling the working state of the handheld cleaner 1000 according to the detected dust concentration after receiving the instruction. That is, after the instruction of turning off the energy-saving mode is received, the handheld cleaner 1000 cannot be controlled to switch the working state, i.e. stopping the energy-saving mode, even if the information is detected. Thus, actual requirements of the user may be satisfied better.

In some specific examples of the present invention, reception of the instruction of turning on the energy-saving mode and reception of the instruction of turning off the energy-saving mode may be integrated into one key, for example, into the control key described above. When the control key is triggered by the odd number of times (like the first time, the third time, the fifth time, etc.), the instruction of turning on the energy-saving mode is received to make the handheld cleaner 1000 enter the energy-saving mode; when the control key is triggered by the even number of times (like the second time, the fourth time, the sixth time, etc.), the instruction of turning off the energy-saving mode is received to make the handheld cleaner 1000 stop the energy-saving mode.

In some specific examples of the present invention, the reception of the instruction of turning on the energy-saving mode and the reception of the instruction of turning off the energy-saving mode may be integrated into two keys, for example into the turn-on control key and the turn-off control key respectively. When the turn-on control key is triggered, the instruction of turning on the energy-saving mode is received to make the handheld cleaner 1000 enter the energy-saving mode; when the turn-off control key is triggered, the instruction of turning off the energy-saving mode is received to make the handheld cleaner 1000 stop the energy-saving mode.

In conclusion, the handheld cleaner 1000 according to some specific embodiments of the present invention has the following advantages.

a. The negative pressure device 3 is disposed in the cup casing 1, such that the dust cup assembly 100 may enjoy a compact, small and lightweight overall structure and be used with high comfort, and the air passages in the dust cup assembly 100 have a compact layout and thus result in less suction power loss and higher energy efficiency.

b. The cyclone separating device is provided in the cup casing 1, thus improving the cleaning effect of the handheld cleaner 1000, and when the cyclone separating device 4 surrounds the negative pressure device 3, the working noise of the handheld cleaner 1000 may be reduced, thus improving environmental friendliness of the handheld cleaner 1000.

c. When the negative pressure device 3 and the device housing 2 are in one piece, space may be saved effectively to further improve the structural compactness of the handheld cleaner 1000, the dust capacity may be improved, and the strength of the device housing 2 may be strengthened without increasing cost, such that the device housing 2 may protect the negative pressure device 3 better to prolong the service life of the negative pressure device 3.

d. Other components in the dust cup assembly 100, except some components in one piece, may be connected in a detachable manner, such that the dust cup assembly 100 is convenient to assemble and disassemble and also may be selectively assembled and disassembled, which facilitates targeted cleaning of internal components of the handheld cleaner 1000 and improves the cleaning effect of the handheld cleaner 1000.

e. The motor 32 and the cyclone 410 are axially spaced apart from each other, so as to make better use of the space in the cup casing 1 and improve the dust suction effect.

f. The air exhaust port 220 is disposed at the bottom of the dust cup assembly 100, the airstream purified by the handheld cleaner 1000 is exhausted downwards, which prevents the dust cup assembly 100 from blowing air to the user, improves the comfort of using the handheld cleaner 1000, and hence raises the user's willingness to use the handheld cleaner 1000.

g. The dust collecting groove 4210 is provided, such that the dust accumulates in dust collecting groove 4210 may be kept away from the airstream flowing in the cup casing 1 and hence will not be rolled up easily to block the filter or enter the next stage of cyclone chamber, and moreover, after the dust in dust collecting groove 4210 accumulates to a certain amount, dust outside the dust collecting groove 4210 may be adhered to, thereby preventing the dust from being blown up and improving the cleaning effect. Additionally, the first dust-blocking sheet 113 and the second dust-blocking sheet 114 are provided in the cup casing 1 to further prevent the dust from being blown repeatedly to block the filter or enter the next stage of cyclone chamber, which improves the cleaning effect.

h. The center of gravity of the handle assembly 200 is raised, such that the whole handheld cleaner 1000 may be held more effortlessly.

i. The extension pipe 300 may enlarge the whole angle range of dust suction of the handheld cleaner 1000 on one hand, and also may be detached from the dust cup assembly 100 to be used separately on the other hand.

j. The first detection device 500A is provided, such that the handheld cleaner 1000 may adjust the working state thereof automatically according to its own motion state, thus achieving the dust suction effect and the energy-saving effect simultaneously.

k. The second detection device 500B is provided, such that the handheld cleaner 1000 may adjust the working state thereof automatically according to the dust concentration, thus achieving the dust suction effect and the energy-saving effect simultaneously.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Reference throughout this specification to "an embodiment," "some embodiments," "an example," "specific examples" or "some examples" means that a particular feature, structure, material, or characteristic described in connection with the embodiment or example is included in at least one embodiment or example of the present invention. Thus, the appearances of the above phrases throughout this specification are not necessarily referring to the same embodiment or example of the present invention. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present invention have been shown and illustrated, it shall be understood by those skilled in the art that various changes, modifications, alternatives and variants without departing from the principle and spirit of the present invention are acceptable. The scope of the present invention is defined by the claims or the like.

What is claimed is:

1. A handheld cleaner, comprising:
   a dust cup assembly, comprising:
      a cup casing;
      a device housing configured to have a tube shape and disposed in the cup casing, wherein an outer end face of the device housing at an axial side thereof abuts against or extends out of a partial inner surface of the cup casing, and a dust removal chamber is defined between an inner surface of the cup casing and an outer peripheral surface of the device housing and surrounds the device housing along a circumferential direction of the device housing; and
      a negative pressure device located within the device housing and configured to enable dusty air to enter the dust removal chamber for dust and air separation;
      a cyclone separating device disposed in the dust removal chamber and defining multiple stages of cyclone chambers communicated successively in a flow direction of an airstream in the dust removal chamber; each stage of cyclone chamber is configured to be a hollow annular-columnar chamber; and an upstream stage of cyclone chamber surrounds a downstream stage of cyclone chamber along the circumferential direction of the device housing, and the most downstream stage of cyclone chamber surrounds the device housing along the circumferential direction of the device housing;
a holding assembly mounted to the dust cup assembly and configured for handholding,
wherein the partial inner surface of the cup casing has an opening, the outer end face of the device housing at the axial side thereof has an air exhaust port, the air exhaust port is disposed at the opening and exposed from the opening, and the negative pressure device is further configured to make an airstream separated from the dust removal chamber enter the device housing and exhausted through the air exhaust port.

2. The handheld cleaner according to claim 1, further comprising:
an in-housing filter disposed in the device housing and located between the air exhaust port and the negative pressure device.

3. The handheld cleaner according to claim 1, wherein the opening is formed in a bottom wall of the cup casing, the device housing is configured to have an upright tube shape, and the air exhaust port is formed at a bottom end of the device housing.

4. The handheld cleaner according to claim 3, wherein the device housing comprises:
a housing body configured to have an upright tube shape and having a bottom end abutting against an inner bottom wall of the cup casing, wherein the dust removal chamber is defined between the inner surface of the cup casing and an outer peripheral surface of the housing body and surrounds the housing body along a circumferential direction of the housing body; and
a housing bottom configured to have a bowl shape and connected to a bottom of the housing body, wherein an outer bottom wall of the housing bottom is fitted with the inner bottom wall of the cup casing, or at least part of the housing bottom extends downwards out of the inner bottom wall of the cup casing via the opening, and the air exhaust port is formed in the housing bottom.

5. The handheld cleaner according to claim 1, wherein the cyclone separating device comprises a first cyclone separating member and a second cyclone separating member; the first cyclone separating member surrounds the device housing and the second cyclone separating member surrounds the first cyclone separating member; and the negative pressure device is configured to make the dusty air entering the dust removal chamber first undergo dust and air separation by the second cyclone separating member and then undergo dust and air separation by the first cyclone separating member.

6. The handheld cleaner according to claim 5, wherein the device housing comprises a first tube segment, a transition tube segment and a second tube segment successively connected along an axial direction of the device housing, in which a maximum diameter of the first tube segment is smaller than a minimum diameter of the second tube segment; in a radial direction of the device housing, the first cyclone separating member is opposite to the first tube segment or to the first tube segment and the transition tube segment, and the negative pressure device is opposite to the second tube segment or to the second tube segment and the transition tube segment.

7. The handheld cleaner according to claim 5, wherein the second cyclone separating member is configured as a continuous tube-shaped filter sleeved between the device housing and the cup casing; a first-stage cyclone chamber is defined by the second cyclone separating member and the cup casing; and an outer peripheral surface of the continuous tube-shaped filter is formed with a dust collecting groove recessed inwards and communicating with the first-stage cyclone chamber.

8. The handheld cleaner according to claim 5, wherein the second cyclone separating member is configured as a split tube-shaped filter sleeved between the device housing and the cup casing; a first-stage cyclone chamber is defined by the second cyclone separating member, the device housing and the cup casing; and a dust collecting groove is defined by a split of the split tube-shaped filter and the outer peripheral surface of the device housing, and communicates with the first-stage cyclone chamber.

9. The handheld cleaner according to claim 1, wherein the cup casing comprises:
a cup body configured to have a tube shape and having an axial open end; and
a cup cover assembly configured to detachably cover the open end of the cup body.

10. The handheld cleaner according to claim 9, wherein the cup cover assembly comprises:
an inner cover disposed on the open end of the cup body;
an outer cover disposed on the open end of the cup body and covered over the inner cover; and
an in-cover air passage member detachably disposed between the inner cover and the outer cover or integrally formed to an inner surface of the outer cover, in which a communicating chamber is defined between the in-cover air passage member and the inner cover, and the negative pressure device is configured to enable the airstream separated from the dust removal chamber to enter the device housing through the communicating chamber.

11. The handheld cleaner according to claim 10, wherein the cup cover assembly further comprises:
an in-cover filter detachably disposed in the communicating chamber to filter the airstream flowing into the communicating chamber.

12. The handheld cleaner according to claim 10, wherein the inner cover has an extension segment extending towards an interior of the cup body, and the extension segment defines an inflow communication hole for communicating the dust removal chamber with the communicating chamber;
the inner cover has an air outlet ring fitted with an air inlet end of the device housing through sleeve connection, and the air outlet ring defines an outflow communication hole for communicating the communicating chamber with an interior of the device housing.

13. The handheld cleaner according to claim 1, wherein the negative pressure device is mounted to the device housing through a bracket, and the bracket comprises:
an upholding portion supporting a bottom of the negative pressure device;
a connecting portion connected with the upholding portion and connected to the device housing; and
a position limiting portion configured to be annular, fitted over the negative pressure device, and connected to the connecting portion and/or the upholding portion.

14. The handheld cleaner according to claim 1, wherein the holding assembly is configured as a handle assembly, and the handle assembly comprises:
a handle casing having a holding portion for user handholding; and
a power supply device disposed in the holding portion, and/or disposed at a position in the handle casing opposite to the holding portion.

15. The handheld cleaner according to claim 14, wherein the handle casing has a gripping hole; the handle casing comprises the holding portion and a mounting portion located at two sides of the gripping hole, the mounting portion is connected with the dust cup assembly; and the power supply device is disposed in the mounting portion and/or the holding portion.

16. The handheld cleaner according to claim 1, further comprising an extension pipe, wherein the extension pipe comprises:
a pipe body member configured as a hollow pipe with two open ends and having a first end connected with a dust suction inlet of the cup casing; and
a rotating member provided at a second end of the pipe body member, formed in one piece with the pipe body member, and provided with an inlet hole in communication with an interior of the pipe body member, such that dust enters the pipe body member through the inlet hole and enters the dust suction inlet along the pipe body member, in which the rotating member is capable of rotating relative to the pipe body member, and orientation of the inlet hole is changed with respect to the pipe body member during rotation of the rotating member.

17. The handheld cleaner according to claim 16, wherein the pipe body member and the rotating member are connected by a pivoting shaft, or the pipe body member and the rotating member are connected through spherical fit.

18. The handheld cleaner according to claim 1, further comprising an extension pipe configured as a hollow pipe with two open ends, wherein a first end of the extension pipe is detachably communicated with a dust suction inlet of the cup casing, and a second end thereof has a cleaning member formed in one piece with the extension pipe.

19. The handheld cleaner according to claim 18, further comprising a telescopic hose having a first end extending into and fixed in the extension pipe, and a second end detachably connected with the dust suction inlet, wherein the first end of the extension pipe is detachably connected with the cup casing, and the telescopic hose is received within the extension pipe when the extension pipe is connected with the cup casing.

20. The handheld cleaner according to claim 1, further comprising:
a cabinet comprising the cup casing and a handle casing;
a first detection device disposed to the cabinet and configured to detect a motion state of the cabinet; and
a control device connected with the first detection device and the negative pressure device, and configured to control a working state of the handheld cleaner according to information detected by the first detection device.

21. The handheld cleaner according to claim 20, wherein the control device is configured to control the negative pressure device to increase suction strength thereof if the first detection device detects that a motion speed of the cabinet rises, and to control the negative pressure device to decrease the suction strength thereof if the first detection device detects that the motion speed of the cabinet drops.

22. The handheld cleaner according to claim 20, wherein the control device is configured to control the negative pressure device to shut down, if the first detection device detects that the cabinet has never moved in a first predetermined duration during operation of the negative pressure device;
the control device is configured to control the negative pressure device to turn on, if the first detection device detects displacement of the cabinet in a second predetermined duration after a shutdown of the negative pressure device; and
the control device is configured to control the handheld cleaner to turn off, if the first detection device detects no displacement of the cabinet in the second predetermined duration after the shutdown of the negative pressure device.

23. The handheld cleaner according to claim 1, wherein the cup casing has an air intake passage in communication with the dust removal chamber, and the handheld cleaner further comprises:
a second detection device configured to detect a dust concentration in the air intake passage; and
a control device connected with the second detection device and the negative pressure device, and configured to control a working state of the negative pressure device according to information detected by the second detection device.

24. The handheld cleaner according to claim 23, wherein the control device is configured to control the negative pressure device to increase suction strength thereof if the second detection device detects that the dust concentration rises; and
the control device is configured to control the negative pressure device to decrease the suction strength thereof if the second detection device detects that the dust concentration drops.

* * * * *